(12) United States Patent
White et al.

(10) Patent No.: US 8,293,083 B2
(45) Date of Patent: Oct. 23, 2012

(54) NANOPORE ELECTRODE, NANOPORE MEMBRANE, METHODS OF PREPARATION AND SURFACE MODIFICATION, AND USE THEREOF

(75) Inventors: Henry S White, Salt Lake City, UT (US); Bo Zhang, Salt Lake City, UT (US); Ryan J White, Salt Lake City, UT (US); Eric N Ervin, Salt Lake City, UT (US); Gangli Wang, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 56 days.

(21) Appl. No.: 12/949,469

(22) Filed: Nov. 18, 2010

(65) Prior Publication Data

US 2011/0168551 A1 Jul. 14, 2011

Related U.S. Application Data

(62) Division of application No. 11/744,154, filed on May 3, 2007, now Pat. No. 7,849,581.

(60) Provisional application No. 60/919,659, filed on Mar. 23, 2007, provisional application No. 60/797,850, filed on May 5, 2006.

(51) Int. Cl.
*G01N 27/333* (2006.01)
*G01N 27/40* (2006.01)
*C25B 13/02* (2006.01)
*C25B 13/04* (2006.01)

(52) U.S. Cl. ... 204/420; 204/295; 204/296; 204/403.06; 204/403.07; 204/601; 204/605; 204/622; 204/625; 204/632; 204/638; 204/639

(58) Field of Classification Search ............... 205/778; 324/693, 713, 525; 204/295, 296, 420, 403.06, 204/403.07, 622, 625, 632, 638, 639, 601, 204/605; 422/82.01, 68.1, 82.05, 82.09; 435/287.1
See application file for complete search history.

(56) References Cited

U.S. PATENT DOCUMENTS 7,201,836 B2 4/2007 Vogel et al.
(Continued)

FOREIGN PATENT DOCUMENTS

DE 210352 6/1984
(Continued)

OTHER PUBLICATIONS

Andersen et al., "The Heterogeneous Collision Velocity for Hydrated Ions in Aqueous Solutions Is ~$10^4$ cm/s", J. Phys. Chem., vol. 100, 1996, pp. 4622-4629.
(Continued)

*Primary Examiner* — Bruce Bell
(74) *Attorney, Agent, or Firm* — Diederiks & Whitelaw, PLC

(57) ABSTRACT

Provided are fabrication, characterization and application of a nanodisk electrode, a nanopore electrode and a nanopore membrane. These three nanostructures share common fabrication steps. In one embodiment, the fabrication of a disk electrode involves sealing a sharpened internal signal transduction element ("ISTE") into a substrate, followed by polishing of the substrate until a nanometer-sized disk of the ISTE is exposed. The fabrication of a nanopore electrode is accomplished by etching the nanodisk electrode to create a pore in the substrate, with the remaining ISTE comprising the pore base. Complete removal of the ISTE yields a nanopore membrane, in which a conical shaped pore is embedded in a thin membrane of the substrate.

16 Claims, 19 Drawing Sheets

U.S. PATENT DOCUMENTS

| | | | |
|---|---|---|---|
| 7,777,505 B2 * | 8/2010 | White et al. | 324/693 |
| 2005/0009004 A1 | 1/2005 | Xu et al. | |
| 2006/0063171 A1 | 3/2006 | Akeson et al. | |
| 2006/0084106 A1 | 4/2006 | Beattie | |
| 2008/0025875 A1 * | 1/2008 | Martin et al. | 422/82.01 |
| 2010/0025263 A1 | 2/2010 | White et al. | |
| 2010/0038243 A1 | 2/2010 | White et al. | |
| 2010/0320094 A1 * | 12/2010 | White et al. | 205/778 |

FOREIGN PATENT DOCUMENTS

| | | |
|---|---|---|
| JP | 2003287515 | 10/2003 |
| WO | WO 2004/064993 | 8/2004 |
| WO | WO 2005/105272 | 11/2005 |
| WO | WO 2007/025104 | 3/2007 |

OTHER PUBLICATIONS

Andersen, "Ion Movement Through Gramicidin A Channels", Biophys. J., vol. 41, Feb. 1983, pp. 135-146.

Andersen, "Ion Movement Through Gramicidin A Channels", Biophys. J., vol. 41, Feb. 1983, pp. 147-165.

Arrigan. "Nanoelectrodes, Nanelectrode Arrays and Their Applications", Analyst, vol. 129, 2004, pp. 1157-1165.

Bard et al., "Electrochemical Methods: Fundamentals and Applications", Second Edition, John Wiley & Sons, Inc., pp. 24-28.

Bayley et al., "Stochastic Sensors Inspired by Biology", Nature, vol. 413, Sep. 2001, pp. 226-230.

Chen et al., "Electrocatalysis Under Conditions of High Mass Transport: Investigation of Hydrogen Oxidation on Single Submicron Pt Particles Supported on Carbon", J. Phys. Chem. B., vol. 108, 2004, pp. 13984-13994.

Chen et al., "Probing Single DNA Molecule Transport Using Fabricated Nanopores", Nano Letters, vol. 4, No. 11, 2004, pp. 2293-2298.

Chen et al., "The Voltammetric Response of Nanometer-Sized Carbon Electrodes", J. Phys. Chem, B., vol. 106, 2002, pp. 9396-9404.

Conyers, Jr. et al., "Electrochemical Characterization of Electrodes with Submicrometer Dimensions", Analytical Chemistry, vol. 72, No. 18, Sep. 2000, pp. 4441-4446.

Daiguji et al., "Ion Transport in Nanofluidic Channels", Nano Letters, vol. 4, No. 1, 2004, pp. 137-142.

Deamer et al., "Characterization of Nucleic Acids by Nanopore Analysis", Accounts of Chemical Research, vol. 35, No. 10, 2002, pp. 817-825.

Fan et al., "DNA Translocation in Inorganic Nanotubes", Nano Letters, vol. 5, No. 9, Sep. 2005, pp. 1633-1637.

Fan et al., "Electrochemical Detection of Single Molecules", Science, vol. 267, Feb. 1995, pp. 871-874.

Fan et al., "Single Molecule Electrochemistry", J. Am Chem. Soc., vol. 118, 1996, pp. 9669-9675.

Fologea et al., "Detecting Single Stranded DNA With a Solid State Nanopore", Nano Letters, vol. 5, No. 10, 2005, pp. 1905-1909.

Fologea et al., "Slowing DNA Translocation in a Solid-State Nanpore", Nano Letters, vol. 5, No. 9, pp. 1734-1737.

Gu et al., "Stochastic Sensing of Organic Analytes by a Pore-Forming Protein Containing a Molecular Adapter", Nature, vol. 398, Apr. 1999, pp. 686-690.

Harrell et al., "Synthetic Single-Nanopore and Nanotube Membranes", Analytical Chemistry, vol. 75, No. 24, Dec. 2003, pp. 6861-6867.

Harrell et al., "DNA-Nanotube Artificial Ion Channels", J. Am. Chem. Soc. vol. 126, 2004, pp. 15646-15647.

Heins et al., "Detecting Single Porphyrin Molecules in a Conically Shaped Synthetic Nanpore", Nano Letters, vol. 5, No. 9, 2005, pp. 1824-1829.

Hinds et al., "Aligned Multiwalled Carbon Nanotube Membranes", Science, vol. 303, Jan. 2004, pp. 62-65.

Hrapovic et al., "Picoamperometric Detection of Glucose at Ultrasmall Platinum-Based Biosensors: Preparation and Characterization", Analytical Chemistry, vol. 75, No. 14, Jul. 2003, pp. 3308-3315.

Huang et al., "A Method for the Fabrication of Low-Noise Carbon Fiber Nanoelectrodes", Analytical Chemistry, vol. 73, No. 5, Mar. 2001, pp. 1048-1052.

Ito et al., Simultaneous Determination of the Size and Surface Charge of Individual Nanoparticles Using a Carbon Nanotube-Based Coulter Counter, Analytical Chemistry, vol. 75, No. 10, May 2003, pp. 2399-2406.

Ito et al., "A Carbon Nanotube-Based Coulter Nanoparticle Counter", Accounts of Chemical Research, vol. 37, No. 12, 2004, pp. 937-945.

Jirage et al., "Nanotubule-Based Molecular-Filtration Membranes", Science, vol. 278, Issue 5338, Oct. 1997, pp. 655.

Karnik et al., "Electrostatic Control of Ions and Molecules in Nanofluidic Transistors", Nano Letters, vol. 5, No. 5, 2005, pp. 943-948.

Kasianowicz et al., "Characterization of Individual Polynucleotide Molecules Using a Membrane Channel", Proc. Natl. Acad. Sci., vol. 93, Nov. 1996, pp. 13770-13773.

Katemann et al., "Fabrication and Characterization of Needle-Type Pt-Disk Nanoelectrodes", Electroanalysis, vol. 14, No. 1, 2002, pp. 22-28.

Lee et al., "pH-Switchable, Ion-Permselective Gold Nanotubule Membrane Based on Chemisorbed Cysteine", Analytical Chemistry, vol. 73, No. 4, Feb. 2001, pp. 768-775.

Li et al., "DNA Molecules and Configurations in a Solid-State Nanopore Microscope", Nature Materials, vol. 2, Sep. 2003, pp. 611-615.

Li et al., "Ion-Beam Sculpting at Nanometre Length Scales", Nature, vol. 412, Jul. 2001, pp. 166-169.

Libioulle et al., "Very Sharp Platinum Tips for Scanning Tunneling Microscopy", Rev. Sci. Instrum. vol. 66, No. 1, Jan. 1995, pp. 97-100.

Liu et al., "Photoregulation of Mass Transport Through a Photoresponsive Azobenzene-Modified Nanoporous Membrane", Nano Letters, vol. 4, No. 4, 2004, pp. 551-554.

Majumder et al., "Effect of Tip Functionalization on Transport Through Vertically Oriented Carbon Nanotube Membranes", J. Am. Chem. Soc., vol. 127, 2005, pp. 9062-9070.

Meller, "Dynamics of Polynucleotide Transport Through Nanometre-Scale Pores", J. Phys.: Condens. Matter, vol. 15, 2003, pp. R581-R607.

Melmed, "The Art and Science and Other Aspects of Making Sharp Tips", J. Vac. Sci. Technol. B, vol. 9, No. 2, 1991, pp. 601-608.

Melmed et al., "An Approach to Realism in Field Ion Microscopy Via Zone Electropolishing", J. Vac. Sci. Technol. A, vol. 2, No. 3, 1984, pp. 1388-1389.

Penner et al., "Fabrication and Use of Nanometer-Sized Electrodes in Electrochemistry", Science, vol. 250, 1990, pp. 1118-1121.

Penner et al., "Preparation and Electrochemical Characterization of Conical and Hemispherical Ultramicroelectrodes", Analytical Chemistry, vol. 61, 1989, pp. 1630-1636.

Saito, "A Theoretical Study on the Diffusion Current at the Stationary Electrodes of Circular and Narrow Band Types", Review of Polarography, vol. 15, No. 6, 1968, pp. 177-187.

Shao et al., "Nanometer-Sized Electrochemical Sensors", Analytical Chemistry, vol. 69, No. 8, Apr. 1997, pp. 1627-1634.

Siwy, "Ion-Current Rectification in Nanopores and Nanotubes with Broken Symmetry", Advanced Functional Materials, vol. 16, 2006, pp. 735-746.

Slevin et al., "Fabrication and Characterisation of Nanometre-Sized Platinum Electrodes for Voltammetric Analysis and Imaging", Electrochemistry Communications, 1999, pp. 282-288.

Song et al., "Structure of Staphylococcal α- Hemolysin, α Heptameric Transmembrane Pore", Science, vol. 274, Dec. 1996, pp. 1859-1866.

Storm et al., "Fabrication of Solid-State Nanopores with Single-Nanometre Precision", Nature Materials, vol. 2, Aug. 2003, pp. 537-540.

Umezawa et al., "Ion Channel Sensors Based on Artificial Receptors", Analytical Chemistry, Sep. 2004, pp. 321-326.

Wang et al., "Photon Gated Transport at the Glass Nanopore Electrode", J. Am. Chem. Soc., vol. 128, 2006, pp. 13553-13558.

Watkins et al., "Zeptomole Voltammetric Detection and Electron-Transfer Rate Measurements Using Platinum Electrodes of Nanometer Dimensions", Analytical Chemistry, vol. 75, No. 16, Aug. 2003, pp. 3962-3971.

Watkins et al., *Electrochemistry at Nanometer-Scaled Electrodes*, Journal of Chemical Education, vol. 82, No. 5, May 2005, pp. 712-719.

Wei et al., "*Current Rectification at Quartz Nanopipet Electrodes*", Analytical Chemistry, vol. 69, No. 22, Nov. 1997, pp. 4627-4633.

White et al., "*Ionic Conductivity of the Aqueous Layer Separating a Lipid Bilayer Membrane and a Glass Support*", Langmuir, vol. 22, 2006, pp. 10777-10783.

Wightman, "*Probing Cellular Chemistry in Biological Systems with Microelectrodes*", Science, vol. 311, Mar. 2006, pp. 1570-1574.

Woo et al., *Fabrication of Nanoscale Gold Disk Electrodes Using Ultrashort Pulse Etching*, Analytical Chemistry, vol. 75, No. 23, Dec. 2003, pp. 6732-6736.

Zhang et al., "*Steady-State Voltammetric Response of the Nanopore Electrode*", Analytical Chemistry, vol. 78, No. 2, Jan. 2006, pp. 477-483.

Zhang et al., "*Steady-State Voltammetric Response of the Nanopore Electrode*", Analytical Chemistry, vol. 78, No. 2, Jan. 2006, pp. 588-594.

Zhang et al., "*The Nanopore Elextrode*", Analytical Chemistry, vol. 76, No. 21, Nov. 2004, pp. 6229-6238.

Zhang et al., "*Electrochemistry of Nanopore Electrodes in Low Ionic Strength Solutions*", J. Phys. Chem. B., vol. 110, 2006, pp. 1768-1774.

Zoski, "*Ultramicroelectrodes: Design, Fabrication, and Characterization*", Electroanalysis, vol. 14, No. 15-16, 2002, pp. 1041-1051.

Chang et al., "*DNA-Mediated Fluctuations in Ionic Current through Silicon Oxide Nanopore Channels*", Nano Letters, vol. 4, pp. 1551-1556, 2004.

Siwy et al., "*Protein Biosensors Based on Biofunctionalized Conical Gold Nanotubes*", J. Am. Chem. Soc., No. 127, pp. 5000-5001, 2005.

Koçer et al., "*A Light-Actuated Nanovalve Derived from a Channel Protein*", Science, vol. 309, pp. 755-758, 2005.

Horrocks et al., "*Scanning Electrochemical Microscopy. 19. Ion-Selective Potentiometric Microscopy*", Anal. Chem., No. 65, pp. 1213-1224, 1993.

Aksimentiev et al., "*Imaging α-Hemolysin with Molecular Dynamics: Ionic Conductance, Osmotic Permaeability, and the Electrostatic Potential Map*", Biophysical Journal, vol. 88, pp. 3745-3761, 2005.

Meller et al., "*Voltage Driven DNA Translocations Through a Nanopore*", Physical Review Letters, vol. 86, No. 15, Apr. 9, 2001, pp. 3435-3438.

Chrisey et al., "*Covalent Attachment of Synthetic DNA to Self-Assembled Monolayer Films*", Nucleic Acids Research, vol. 24, Issue 15, 1996, abstract.

Molleman, "*Patch Clamping*", John Wiley & Sons, Ltd., ISBN: 0-471-48685-X, 2003.

Wayment et al., "*Controlling Binding Site Densities on Glass Surfaces*", Analytical Chemistry, vol. 78, No. 22, Nov. 2006, pp. 7841-7849.

White et al., "*Chapter 5, How to Set Up a Bilayer System*", The Physical Nature of Planar Bilayer Membranes in Ion Channel Reconstruction, Plenum Publishing Co., 1986, pp. 115-130.

Wang et al., "*Electrostatic-Gated Transport in Chemically Modified Glass Nanopore Electrodes*", J. Am. Chem. Soc., vol. 128, 2006, pp. 7679-7686.

\* cited by examiner

A.

B.

NANOPORE ELECTRODE, NANOPORE MEMBRANE, METHODS OF PREPARATION AND SURFACE MODIFICATION, AND USE THEREOF

CROSS-REFERENCE TO RELATED APPLICATIONS

This application represents a divisional application of U.S. application Ser. No. 11/744,154, filed May 3, 2007 now U.S. Pat. No. 7,849,581 which claims the benefit under 35 U.S.C. §119(e) of U.S. Provisional Application No. 60/919,659, filed Mar. 23, 2007 and U.S. Provisional Application No. 60/797,850, filed May 5, 2006, the entirety of each of which is incorporated by this reference.

STATEMENT REGARDING FEDERALLY SPONSORED RESEARCH OR DEVELOPMENT

This invention was made with government support under grant #FA9550-06-C-0006 awarded by the Defense Advance Research Projects Agency. This invention was also made with government support under grant #ES013548 awarded by the National Institutes of Health. This invention was also made with government support under grant CHE-0616505 awarded by the National Science Foundation. The US government has certain rights to this invention.

TECHNICAL FIELD

The invention relates to the field of nanotechnology. In particular, the invention is related to nanodisk electrodes, nanopore electrodes and nanopore membranes.

BACKGROUND

Molecular transport in individual pores (e.g., protein ion channels ((a) Kasianowicz, J. J.; Brandin, E.; Branton, D.; Deamer, D. W. *Proc. Natl. Acad. Sci. U.S.A.* 1996, 93, 13770; (b) Bayley, H; Cremer, P. S. *Nature* 2001, 413, 226; (c) Gu, L.-Q.; Braha, O.; Conlan, S.; Cheley, S. and Bayley, H. *Nature* 1999, 398, 686) and synthetic channels ((a) Ito, T.; Sun, L.; Crooks, R. M. *Anal. Chem.* 2003, 75, 2399; (b) Ito, T.; Sun. L.; Henriquez, R. R.; Crooks, R. M. *Acc. Chem. Res.* 2004, 37, 937; (c) Hinds, B. J.; Chopra, N.; Rantell, T.; Andrews, R.; Gavalas, V.; Bachas, L. G. *Science* 2004, 303, 62. (d) Majumber, M.; Chopra, N.; Hings, B. J. *J. Am. Chem. Soc.* 2005, 127, 9062; (e) Li, J.; Gershow, M.; Stein, D.; Brandin, D.; Golovchenko, J. A. *Nat. Mater.* 2003, 2, 611; (f) Li, J.; Stein, D.; McMullan, C.; Branton, D.; Aziz, M. J.; Golovchenko, J. A. *Nature* 2001, 412, 166.)) and in materials containing pores of nanometer dimensions (e.g., zeolite catalysts and skin) are of interest throughout chemistry and biology. It is generally recognized that transport selectivity, based on a chemical or physical property of the permeant, is often observed in pores when the size of the pore is sufficiently small that interactions between the pore surface and permeant influence local transport dynamics ("permeant" refers to a molecule or ion that passes through the pore). The rate of alkali metal ion transport through gramicidin channels, for instance, is highly dependent on metal ion radius, a consequence of the channel radius (~2 Å) being comparable to the dehydrated ion radius ((a) Andersen, O. S.; Feldberg, S. W. *J. Phys. Chem.* 1996, 100, 4622; (b) Andersen, O. S. *Biophys. J.* 1983, 41, 147; (c) Andersen, O. S. *Biophys. J.* 1983, 41, 135).

Longer range interactions over a few to tens of nanometers (e.g., electrostatic forces) between the pore surface and permeant can also lead to transport selectivity in pores of larger dimensions ((a) Daiguji, H.; Yang, P.; Majumdar, A. *Nano Lett.* 2004, 4, 137; (b) Karnik, R.; Fan, R.; Yue, M.; Li, D.; Yang, P.'; Majumdar, A. *Nano Lett.*, 2005, 5, 943).

Developments over the past several decades in understanding pore transport mechanisms and the origins of transport selectivity have led to recent interest in the development of chemical and biological sensors based on selective transport through nanometer scale channels and pores. Protein ion channels, such as α-hemolysin, engineered or chemically modified to interact with a target analyte, are capable of detecting individual molecules by measuring the modulation of ionic current through the protein upon analyte binding (Meller, A. *J. Phys. Condens. Matter* 2003, 15, R581). The ability to observe molecule or particle transport dynamics within individual nanopores, rather than ensembled averaged results, has motivated fundamental research on pores employing biological as well as synthetic affinity pairs (Umezawa, Y.; Aoki, H. *Anal. Chem.* 2004, 76, 320 A).

In addition to biological pores, there have been significant advances in analytic detection employing synthetic pores in recent years, made largely possible by the rapid developments in methods and materials for nanoscale synthesis ((a) Jirage, K. B.; Hulteen, J. C.; Martin, C. R. *Science* 1997, 278, 655; (b) Harrell, C. C.; Lee, S. B.; Martin, C. R. *Anal. Chem.* 2003, 75, 6861 (c) Harrell, C. C.; Kohli, P. Siwy, Z.; Martin, C. R. *J. Am. Chem. Soc.* 2004, 126, 15646. (d) Fologea, D.; Gershow, M.; Ledden, B.; McNabb, D. S.; Golovchenko, J. A.; Li, Jiali *Nano Lett.* 2005, 5, 1905; (e) Fologea, D.; Gershow, M.; Uplinger, J; Thomas, B.; McNabb, D. S.; Li, Jiali *Nano Lett.* 2005, 5, 1734; (f) Chen, P.; Gu, J.; Brandin, E., Kin, Y.-R., Wang, Q.; Branton, D. *Nano Lett.*, 2004, 4, 2293; (g) Storm, A. J.; Chen, J. H.; Ling, x. S.; Zandbergen, H. W.; Dekker, C. *Nat. Mater.* 2003, 2, 537; (h) Liu, N.; Dunphy, D. R.; Atanassov, P.; Bunge, S. D.; Chen, Z.; López, G. P.; Boyle, T. J.; Brinker, C. J. *Nano Lett.* 2004, 4, 551; (i) Fan, R. Karnik, R.; Yue, M. Li, D., Majumdar, A; Yang, P. *Nano Lett.* 2005, 5, 1633). For example, polycarbonate membranes that contain nanosize channels have been employed for the template synthesis of gold nanotubes, which can be subsequently functionalized for biosensor applications including the detection of DNA molecules (Heins, E. A.; Siwy, Z. S.; Baker, L. A.; Martin, C. R. *Nano Lett.*, 2005, 5, 1824.). pH-switchable ion transport selectivity has been achieved by attachment of cysteine at the surface of the Au nanotubes (Lee, S. B.; Martin, C. R. Anal. Chem. 2001, 73, 768). Solid-state nanopores fabricated in $Si_3N_4$ membranes ((a) Fologea, D.; Gershow, M.; Ledden, B.; McNabb, D. S.; Golovchenko, J. A.; Li, Jiali *Nano Lett.* 2005, 5, 1905; (b) Fologea, D.; Gershow, M.; Uplinger, J; Thomas, B.; McNabb, D. S.; Li, Jiali *Nano Lett.* 2005, 5, 1734; (c) Chen, P.; Gu, J.; Brandin, E., Kin, Y.-R., Wang, Q.; Branton, D. *Nano Lett.*, 2004, 4, 2293; (d) Storm, A. J.; Chen, J. H.; Ling, x. S.; Zandbergen, H. W.; Dekker, C. *Nat. Mater.* 2003, 2, 537; (e) Liu, N.; Dunphy, D. R.; Atanassov, P.; Bunge, S. D.; Chen, Z.; Lopez, G. P.; Boyle, T. J.; Brinker, C. J. *Nano Lett.* 2004, 4, 551) have been used for single molecule analysis and DNA detection, and silicon nanotubes have been integrated with microfluidic systems for DNA sensing (Fan, R. Karnik, R.; Yue, M. Li, D., Majumdar, A; Yang, P. *Nano Lett.* 2005, 5, 1633.) Carbon nanotubes (CNTs) have been employed as a nanoparticle Coulter counter (Ito, T.; Sun, L.; Crooks, R. M. *Anal. Chem.* 2003, 75, 2399). Aligned and chemically modified CNTs, incorporated into polymer films to created multichannel membrane structures, are also capable of reporting analyte binding (Majumber, M.; Chopra, N.; Hings, B. J. *J. Am. Chem. Soc.* 2005, 127, 9062).

The use of biological nanopores, for detection of single molecules has been in practice for two decades (see, e.g., Deamer, D. W., Branton, D., *Acc. Chem. Res.* 2002, 35, 817-825). For example, the biological protein nanopore α-hemolysin (αHL) from *Staphylococcus aureus* has proven to be ideal for single molecule detection, given the inner pore constriction diameter of 1.6 nm (Song, S., Hobaugh, M. R., Shustak, C., Cheley, S., Bayley, H., Govaux, J. E., *Science*, 1996, 274, 1859-1865).

The use of nanometer-scale electrodes has also attracted considerable interest as tools in fundamental research since the late 1980s. For example, nanoelectrodes have been employed in studies of fast electron-transfer reactions (Watkins, J. J.; Chen, J.; White, H. S.; Abruña, H. D.; Maisonhaute, E.; and Amatore, C. *Anal. Chem.* 2003, 75, 3962; Penner, R. M.; Heben, M. J.; Longin, T. L.; Lewis, N. S. *Science* 1990, 250, 1118), interfacial structure (Conyers, J. L. Jr.; White, H. S. *Anal. Chem.* 2000, 72, 4441; Chen, S.; Kucemak, A. *J. Phys. Chem. B* 2002, 106, 9396), single electron and single molecule electrochemistry (Fan, F-R. F.; Bard, A. J.; *Science* 1995, 267, 871; Fan, F-R, F.; Kwak, J.; Bard, A. J. *J. Am. Chem. Soc.* 1996, 118, 9669), as mimics of fuel cell catalysts (Chen, S.; Kucemak, A. *J. Phys. Chem. B* 2004, 108, 13984), and as analytical probes in bioelectrochemical measurements (Wightman, R. M. *Science* 2006, 311, 1570).

Methods of fabricating nanometer-sized electrodes can be found in several reports (Zoski, C. G. *Electroanalysis* 2002, 14, 1041; Watkins, J. J.; Zhang, B.; White, H. S. *J. Chem. Edu.* 2005, 82, 712; Arrigan, D. W. M. *Analyst* 2004, 129, 1157). Most frequently, the end of an electrochemically etched carbon fiber or metal wire is sealed into an insulating material (e.g., glass, wax, and polymers) leaving the tip of the fiber or wire exposed (Penner, R. M.; Heben, M. J.; Lewis, N. S. *Anal. Chem.* 1989, 61, 1630; Huang, W-H.; Pang, D-W.; Tong, H.; Wang, Z-L.; Cheng, J-K. *Anal. Chem.* 2001, 73, 1048; Hrapovic, S.; Luong, J. H. T. *Anal. Chem.* 2003, 75, 3308; Slevin, C. J.; Gray, N. J.; Macpherson, J. V.; Webb, M. A.; Unwin, P. R. *Electrochem. Comm.* 1999, 1, 282; Woo, D-H.; Kang, H.; Park, S-M. *Anal. Chem.* 2003, 75, 6732). Electrodes fabricated in this way generally have a hemispherical or conical shape shrouded by a thin layer of insulating material. The nature of the insulator can restrict the use of the electrode. For example, electrodes insulated with thin organic layers are simple to prepare, but their use is generally restricted to aqueous solutions, and they tend to exhibit prohibitively large capacitive currents in transient measurements due to the capacitance of the thin insulating layer (Watkins, J. J.; Chen, J.; White, H. S.; Abruña, H. D.; Maisonhaute, E.; and Amatore, C. *Anal. Chem.* 2003, 75, 3962).

Nanometer sized disk electrodes have been fabricated by pulling Pt wires embedded in glass capillaries with micropipette pullers and subsequently exposing a disk-shaped area of the metal using mechanical polishes or chemical etchants (Ballesteros Katemann, B.; Schuhmann, W. *Electroanalysis* 2002, 14, 22). The resulting glass-shrouded electrodes are durable and have favorable electrical properties. However, using this procedure, it is difficult to prepare electrodes with consistent sizes. Moreover, the use of costly pipette pullers is required. Although Shao et al. mention the monitoring of resistance during the polishing of glass-sealed Pt nano-electrodes (Shao, Y.; Mirkin, M. V.; Fish, G.; Kokotov, S.; Palanker, D.; Lewis, A. *Anal. Chem.* 1997, 69, 1627), no details of the methodology and instrumentation have been published.

SUMMARY OF INVENTION

Nanodisk Electrode

Provided is a nanodisk electrode, exemplified in FIG. 1(A), comprising a substrate having a first surface and a second surface and an internal signal transduction element ("ISTE") having a first surface and a second surface. The ISTE is embedded in the substrate such that the first surface of the ISTE is within the same plane of the first surface of the substrate, and the second surface of the ISTE is extended, or exposed through the second surface of the substrate. The first surface of the ISTE is defined as a "disk", a "nanodisk" or "microdisk", depending on the radius of the exposed surface; and is exposed through the first surface of the ISTE. The substrate may be configured to include more than one ISTE, or include an array of ISTEs.

In various embodiment, the substrate may be made of, for example, glass, Si, $SiO_2$, $Si_3N_4$, quartz, alumina, nitrides, metals, polymers or other suitable materials. The substrate can be of a pure substance or a composite. In particular embodiments, the substrate is a soda lime or lead glass capillary.

The ISTE may be of various suitable shapes. The ISTE may be made of any material that is suitable for electrical signal transduction. The ISTE is preferably metal, such as, for example, platinum ("Pt"), gold ("Au"), silver ("Ag"), or tungsten ("W") but may be any conducting material, for instance carbon ("C"), a semiconductor (e.g., silicon, "Si") or electronically conducting polymer (e.g., polyanaline). In a particular embodiment, the ISTE comprises a platinum wire. The platinum wire may be further attached to a tungsten rod via silver paint for external electrical connection to electronic instruments. The platinum wire may also be attached to other materials such as copper. In another particular embodiment, the ISTE comprises an Au wire.

Further provided are methods of preparing a nanodisk electrode. Such methods comprises sealing a part comprising the ISTE in a substrate, and polishing the substrate until the first surface, i.e., disk, of the ISTE is exposed.

Further provided are methods of preparing a nanodisk electrode with a disk of a desired radius. Such methods comprise providing an ISTE with a conical tip, sealing the conical tip of the ISTE in a substrate with a part comprising the second surface of the ISTE extended outside of the substrate, polishing the substrate using a polishing means in order to expose the tip, measuring the electrical continuity resistance between the ISTE and the polishing means, and stopping the polishing when the measured resistance reaches a desired resistance. For example, during the polishing, an intermittent electrical measurement using a high-input impedance metal-oxide semiconductor field effect transistor (MOSFET)-based circuit is made to determine the resistance between the extended part of the ISTE and the polishing cloth. The polishing is immediately stopped when the measured resistance meets a desired resistance, which signifies the exposure of a disk of desired size. The desired resistance signifying the exposure of a disk of desirable size may be obtained empirically or determined by finite element simulations and calibration curves.

Nanopore Electrode

Further provided is a nanopore electrode, as exemplified in FIG. 1(B), The nanopore electrode comprises a substrate having a first surface and a second surface, an ISTE having a first surface and a second surface, and a nanopore having an orifice, a base and an interior surface. The ISTE is embedded in the substrate such that the first surface of the ISTE is the base of the nanopore, and the second surface of the ISTE is extended, or exposed through the second surface of the substrate. The orifice of the nanopore opens through the first surface of the substrate. The interior surface of the nanopore is an integral part of the substrate. The first surface of the substrate may also be called the exterior surface of the nanopore. The substrate may be configured to include more than one nanopore and more than one ISTE, or include an array of nanopores and ISTEs. A nanopore electrode can be incorporated into silicon and other microelectronic lithogaphically fabricated devices.

In various embodiments, the substrate may be made of, for example, glass, Si, $SiO_2$, $Si_3N_4$, quartz, alumina, nitrides, metals, polymers or other suitable materials. The membrane can be of a pure substance or a composite. In particular embodiments, the substrate is a soda lime or lead glass capillary.

The nanopore may assume various suitable shapes, preferably a truncated cone shape with the radius of the orifice smaller than that of the base of the nanopore. The radius of the orifice of a conical nanopore preferably ranges from about 2 nm to about 500 nm, or larger. The radius of the base ranges from 100 nm to the diameter of the wire used for the ISTE. The depth of a conical nanopore is the distance from the orifice to the base of the nanopore. The depth is preferably ranging from 10 nm to 100 µm.

The ISTE may be of various suitable shapes. The ISTE may be made of any material that is suitable for electrical signal transduction. The ISTE is preferably metal, such as, for example, Pt, Au, Ag, or W, but may be any conducting material, for instance C, a semiconductor (e.g., Si) or electronically conducting polymer (e.g., polyanaline). In a particular embodiment, the ISTE comprises a platinum wire. The platinum wire may be further attached to a tungsten rod via silver paint. The platinum wire may also be attached to other materials such as copper. In another particular embodiment, the ISTE comprises an Au wire.

The interior surface and/or the exterior surface of the nanopore may be modified to change the surface properties, for example, the electrical charge density, hydrophobicity or hydrophilicity, of the respective surfaces. The exterior surface of the nanopore may be modified by a first entity. The interior surface of the nanopore may be modified by a second entity. The first and second entities may be different entities. The first or second entities may be polymers, small organic molecules, proteins, etc. The modification of the surfaces may be physical or chemical in nature. For example, the first or second entity may be attached to the respective surfaces via noncovalent forces, e.g., by hydrophobic interactions. For another example, the first or second entity may be attached to the respective surfaces via covalent bonds. The second entity may comprise chemical functionalities, e.g., chemically reactive amino groups, or comprise functional binding sites, e.g., streptavidin attached to the interior surface providing biotin binding sites. Alternatively, various functional sensor molecules may be further attached, either by physical force, by chemical bonding or by coordinate covalent bonds, to the second entities that are attached to the interior surface of the nanopore to impart various functions to the nanopore. Lipid bilayers may be deposited across the orifice by various means to serve as supports for proteins, enzymes and other biological molecules that might serve as sensor transduction agents for interacting with, detecting, and analysis of target analytes.

In certain embodiments, the exterior surface of a nanopore is chemically modified by an entity with a single chemical functionality. For example, a chemically reactive silane with an inert terminus, e.g., $Cl(Me)_2Si(CH_2)_3CN$, is reacted to the exterior surface of a glass nanopore to generate a silane monolayer terminating in —CN groups. Other reactive silanes with different terminus groups, and/or with different surface reactive groups (e.g., methoxy groups or multiple chlorine groups), can similarly be attached to the surface to form monolayer and multilayer films. The interior surface of a nanopore may be modified with an entity with a single or multiple functionalities. For example, the interior of a glass nanopore may be silanized by $EtO(Me)_2Si(CH_2)_3NH_2$ to yield a monolayer terminating in —$NH_2$ groups. Various functional molecules may be attached to the interior surface of the nanopore via reaction with the —$NH_2$ groups attached to the interior surface. For example, carboxylate groups of a sensor protein may react with the —$NH_2$ groups and thus the protein is covalently attached to the interior surface of the nanopore via amide bonds. Alternatively, the interior surface may be directly modified with an entity with a functional binding site. For example, $EtO(Me)_2Si(CH_2)_3NH$-streptavidin can be attached to the interior surface of a glass nanopore thus imparting a biotin-binding property to the interior surface. Alternatively, the interior surface of a nanopore may be modified by an entity comprising a bait element, for instance, glutathione, such that another functional entity that recognizes the bait element, for example, a sensor molecule with a GST-tag (glutathione S-transferase tag), can be immobilized to the interior surface of the nanopore by non-covalent bonds.

Further provided is a method of preparing a nanopore electrode, the method comprising preparing a nanodisk electrode as disclosed herein, and etching the exposed surface of the ISTE to produce a nanopore in the substrate.

It is to be noted that the shape and the size of the part of the ISTE that is sealed in the substrate partly defines the shape, and the size of the base and the orifice of the nanopore. For example, if the part of the ISTE that is sealed in the substrate is cylindrical, the resulting nanopore will be of a cylindrical shape. If the part of the ISTE that is sealed in the substrate is conical, the resulting nanopore will be of a truncated conical shape.

Further provided are methods of preparing a chemically modified glass nanopore electrode. Such a method comprises providing a glass nanodisk electrode as disclosed herein; modifying the first surface of the glass nanodisk electrode with a first entity; etching the exposed nanodisk to produce a nanopore; and modifying the interior surface of the nanopore with a second entity. The first surface of the glass nanodisk is also the exterior surface of the nanopore. In certain embodiments, the exterior surface of the nanopore is chemically modified with $Cl(Me)_2Si(CH_2)_3CN$. The modification generates a silane monolayer terminating in —CN groups that protect the exterior surface from further reaction with other chemically reactive entities. One purpose of the modification of the exterior surface is to prevent modification of the exterior surface by an entity that modifies the interior surface of the nanopore, the exterior surface may be modified or coated with any appropriate chemically inert species. After the nanopore is created, the interior glass surface of the nanopore may be silanized by an $EtO(Me)_2Si(CH_2)_3NH_2$ to yield a monolayer terminating in a —$NH_2$ group. Various functional molecules can be attached to the interior surface of the nanopore via reaction with the —$NH_2$ groups attached to the interior surface. Other reactive silanes with different terminus groups, and/or with different surface reactive groups (e.g., methoxy groups or multiple chlorine groups), can similarly be attached to the surface to form monolayer and multilayer films. The interior surface of a nanopore may be modified with an entity with a single or multiple functionalities.

Further provided are methods of forming a surface-modified nanopore electrode, the method comprising: providing a substrate having a first surface and a second surface wherein the first surface is modified by a first entity to change the surface property of the first surface; providing an ISTE having a first surface and a second surface, wherein the first surface of the ISTE is sealed in the substrate and the second surface of the ISTE extends, or exposed through the second surface of the substrate; providing a nanopore having an orifice opening through the first surface of the substrate, having a base wherein the base is the first surface of the ISTE, and having an interior surface wherein the interior surface is modified by a second entity to change the surface property of the interior surface; and optionally providing a functional entity attached to the interior surface of the nanopore via the second entity.

The mass transport of a charged species through a nanopore can be electrostatically gated "on" and "off" by controlling the electrical charge density at the orifice of the nanopore. Accordingly, further provided are methods of using a surface-modified nanopore electrode to control the transport of a charged species. Such a method comprises: providing a sample solution containing at least one charged species to be analyzed; providing a nanopore electrode including an ISTE, wherein the interior surface of the nanopore is modified with a entity such that the electrical charge density at the pore orifice is adjustable by an appropriate adjusting species; contacting the nanopore electrode with the solution such that the exterior surface of the nanopore is immersed in the solution and the nanopore is filled with the solution; applying an appropriate voltage between the solution and the ISTE; add the appropriate adjusting species to the solution such that the electrical charge density at the orifice is varied and that the at least one charged species passing through the nanopore can be electrostatically gated "on" and "off" by controlling the electrical charge density at the orifice; monitoring the electrical conductivity of the nanopore; and analyzing the electrical conductivity to determine to what extent the transfer of the charged species is controlled. The solution need not contain a supporting electrolyte.

For example, the interior surface of a glass nanopore electrode is modified by an entity with terminal —$NH_2$ groups. Adjusting the solution's pH results in a reversible protonation of the —$NH_2$ groups bound to the interior surface of the pore. Thus, the electrical charge density at the pore orifice may be controlled by varying the extent of the protonation of the —$NH_2$ groups on the interior surface of the pore. Accordingly, a protonation of the interior area of the nanopore resulting in terminal —$NH_3^+$ groups may prevent the entry of a positive charged species into the nanopore due to electrostatic repulsion between the —$NH_3^+$ groups and the positive charged groups.

The surface-modified glass nanopore electrode can also be used to control the rate of a redox reaction by adjusting the pH value of a sample solution. For example, in a redox reaction, positive charged species Rox is reduced to species Rred. Rred may be charged or uncharged. The pH value of the solution may be adjusted such that the protonation of the interior area of the nanopore resulting in terminal —$NH_3^+$ groups may prevent the positive charged species Rox from entering into the nanopore due to electrostatic repulsion between the —$NH_3^+$ groups and Rox. Accordingly, the rate of the reduction reaction from Rox to Rred is controlled by controlling the transport rate of Rox.

Also provided are methods of monitoring the pH of a solution. Such a method comprises providing a sample solution containing a charged species as a pH-indicating species; providing a glass nanopore electrode including an ISTE, wherein the interior surface of the nanopore is modified with a entity such that the electrical charge density at the pore orifice varies depending on the pH value of the solution; contacting the nanopore electrode with the solution such that the exterior surface of the nanopore is immersed in the solution and the nanopore is filled with the solution; applying an appropriate voltage between the solution and the ISTE; monitoring the electrical conductivity of the nanopore; and analyzing the electrical conductivity to determine to the pH of the solution.

A surface-modified nanopore electrode with functional entities attached to the interior surface of the nanopore can be used as a sensor for detection of chemical and biological molecules by measuring the change in the conductance of the pore upon binding of the analyte to the functional entity that is attached to the interior surface of the nanopore. Accordingly, provided is a method of using a nanopore electrode to monitor selective binding of analytes. The method comprises: providing a sample solution containing an analyte of interest; providing a nanopore electrode including an ISTE wherein the interior surface of the nanopore is modified with a functional entity such that the functional entity selectively binds to the analyte of interest; contacting the nanopore electrode with the solution such that the exterior surface of the nanopore is immersed in the solution and the nanopore is filled with the solution; applying an appropriate voltage between the solution and the ISTE of the nanopore electrode; monitoring the electrical conductivity of the nanopore; and analyzing the electrical conductivity to determine to the concentration of the analyte of interest. In one embodiment, a lipid bilayer membrane is deposited across the orifice and used as a support of biological transmembrane ion channels for single channel recording. For instance, protein ion channels, such as α-hemolysin, engineered or chemically modified to interact with an analyte of interest, are inserted into the bilayer membrane. Binding of the analyte of interest to the protein ion channels results in a modulation of ionic current through the nanopore. In certain embodiments, appropriate molecules (e.g., antigens, single stranded DNA) are attached to the interior surface of the nanopore to selectively detect proteins and DNA.

Nanopore Membrane

Also provided is a membrane having a thickness, having a first and second side, the first side being opposite to the second side, and having a nanopore extending through the membrane over the thickness of the membrane. A nanopore membrane is exemplified in FIG. 1(C).

In various embodiment of the invention, the membrane may be made of glass, Si, $SiO_2$, $Si_3N_4$, quartz, alumina, nitrides, metals, polymers or other suitable materials. The membrane can be of a pure substance or a composite, or if necessary, comprises a coating that modifies the surface of the material. In a particular embodiment, the substrate is a soda lime or lead glass capillary. The thickness of the membrane is typically the smallest dimension of the membrane. The membrane ranges typically from about 10 μm to several hundreds of micrometer in thickness.

The membrane may be configured to include more than one nanopore, or an array of nanopores. Each individual nanopore may be enclosed in an individual chamber and such individual chambers may be arranged in an array format on suitable support structures.

In various embodiments, the nanopore has a first opening and a second opening. The first opening opens to the first side of the membrane and the second opening opens to the second side of the membrane. The two openings may be of different sizes or shapes. Preferably, the first opening is smaller than the second opening. In particular, the nanopore is of a truncated conical shape, wherein the first opening is smaller the second opening. The radius of the first opening of the nanopore preferably ranges from about 2 nm to about 500 nm, or larger. Radius of the second opening can be about 1 μm to 25 μm. Since the nanopore extends through the membrane, and connects the first side and the second side of the membrane, the thickness of the membrane is typically the length or depth of the nanopore if the thickness of the membrane is uniform across the membrane. The length of the nanopore is preferably 20 times of the radius of the first opening of the nanopore. The length of the nanopore may range from about 20 μm to about 75 μm. The position of the nanopore may be located at any predetermined position on the membrane.

A characteristic of conical-shaped nanopore electrodes and conical-shaped nanopore membranes, which offers great advantage in analytical sensor measurements, is that the largest mass-transport and ionic resistance of the pore is localized at the pore orifice. This feature is a consequence of the combination of (i) the convergent radial flux of molecules and ions from the bulk solution to the disk-shaped orifice and (ii) the divergent radial flux of molecules from the orifice to the electrode. The flux of molecules and ions from the bulk solution to the pore thus obtains a maximum value at the orifice that may be orders of magnitude larger than the flux at the bottom of the pore. This geometry-based localization of the pore resistance at the orifice enhances applications of the conical-shaped nanopores by providing a small-volume and high-resistance transduction region at the small orifice, while the remainder of the wider-region pore provides low-resistance access to the transduction region.

An additional advantage of the conical pore shape described herein is that ion and molecule fluxes through conical pores asymptotically approach a constant value when the depth of the cone-shaped pore is ~50× larger than the radius of the pore orifice, a. The resistance of a conical pore also asymptotically approaches a constant value when the depth of the cone-shaped pore is ~50× larger than the radius of the pore orifice, a.

Further provided are methods of preparing a modified or non-modified nanopore membrane, such a method comprising preparing a modified or non-modified nanopore electrode including an ISTE as disclosed herein, and removing the ISTE leaving a nanopore in the membrane.

DESCRIPTION OF THE FIGURES

FIG. 1 (B) depicts a glass nanopore electrode, and FIG. 1 (C) depicts a glass nanopore membrane.

FIG. 5 (b) shows an electrical circuit that is able to control the size of a nanopore in a glass membrane. FIG. 5 (c) is a photograph of an electrical circuit device attached to a Pt ISTE sealed in a glass membrane and a polishing cloth.

DETAILED DESCRIPTION OF THE INVENTION

It is particularly useful to develop a structurally simple and reliable nanopore platform for investigating molecular transport through orifices of nanoscale dimensions. Provided is a surface-modified nanopore electrode with a built-in ISTE, the preparation and use thereof. In contrast to analytical measurements based on pores in free-standing membranes, the glass nanopore electrode is open to solution though a single orifice. Advantages of this design include: simplicity and reproducibility of fabrication; a built-in signal transduction element (e.g., a Pt electrode) for monitoring transport through the pore (either molecular transport or ion conductance); and mechanical robustness of the solid electrode. The device is portable, relatively inexpensive to produce, and can be readily expanded to an array of nanopore electrode sensors for simultaneous detection of multiple analytes. The device concept can also be incorporated into silicon and other microelectronic lithographically fabricated devices. These analyzers can be used as sensors for pharmaceutical industry, homeland security, and military applications.

In the following description, reference is made to the accompanying drawings, which show, by way of illustration, several embodiments of the invention.

Figure 2:
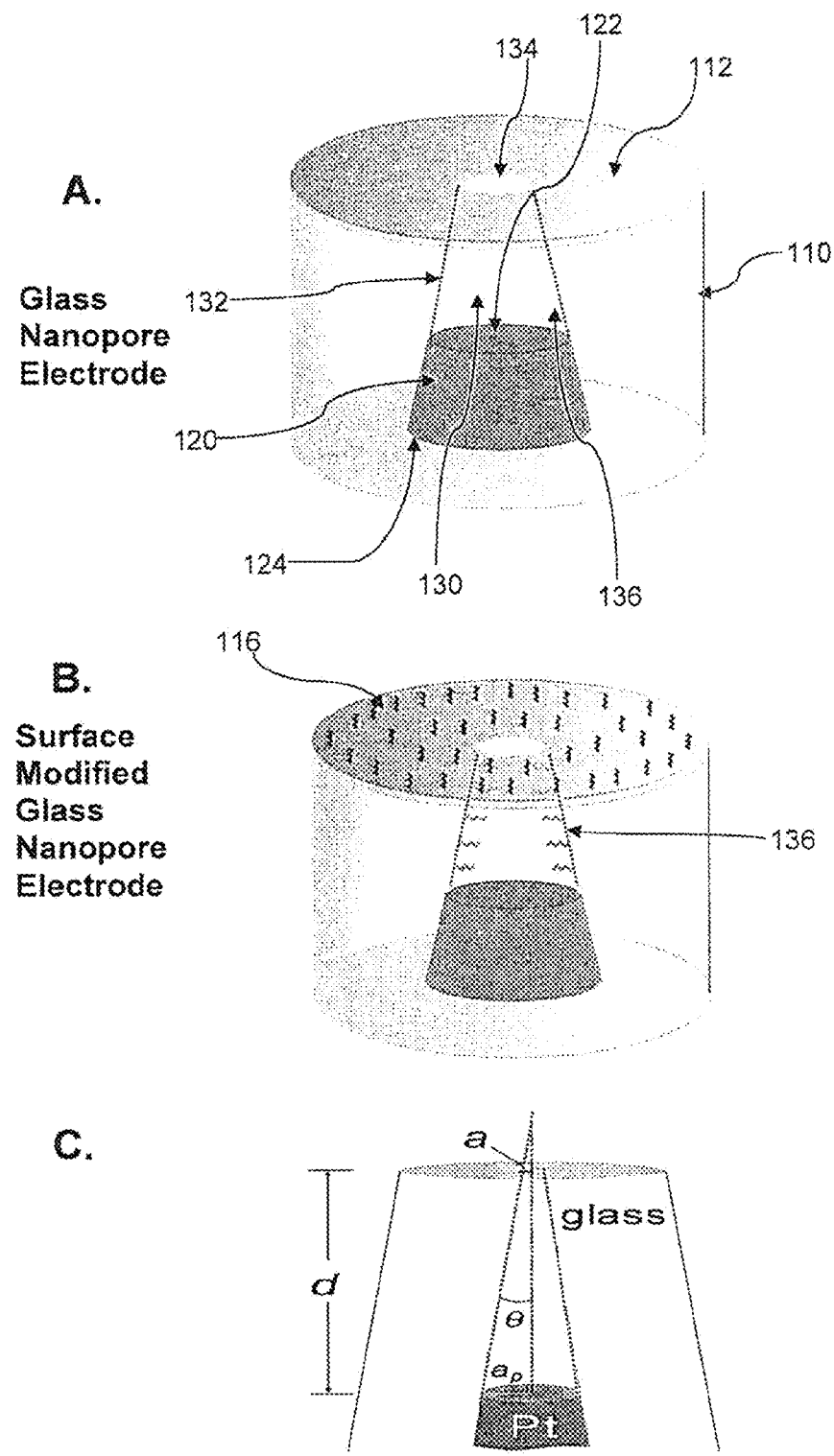
FIG. 2 (A) depicts a nanopore electrode, FIG. 2 (B) depicts a chemically modified nanopore electrode and FIG. 2 (C) depicts the geometry of a nanopore electrode.

FIG. 2 (A) depicts a glass nanopore electrode and FIG. 2 (B) depicts a surface-modified glass nanopore electrode. In FIGS. 2 (A) and (B), nanopore electrode 100 comprises glass substrate 110, Pt wire 120, and nanopore 130. Glass substrate 110 has first surface 112 and second surface 124. First surface 112 is also called the exterior surface of nanopore 130. First surface 112 is modified by first entity 116. First entity 116 that was attached to first surface 112 changes the surface property of first surface 112. The choice of first entity 116 depends on the surface property desired. Pt wire 120 has first surface 122 and second surface 124. First surface 122 is embedded in substrate 110. Pt wire 120 may extend through substrate 110 on the end comprising second surface 124. Optionally, Pt wire 120 does not extend through second surface 114 of substrate 110 as long as second surface 124 is exposed through second surface 124. Nanopore 130 comprises interior surface 132, circular orifice 134, and circular base 122. Orifice 134 opens through first surface 112 of substrate 110. It is to be noted that base 122 of nanopore 130 is the first surface of Pt wire 120. Base 122 is also called a disk, in this case, a Pt disk. Interior surface 132 is modified with second entity 136. Second entity 136 that is attached to interior surface 132 changes the surface property of interior surface 132. The choice of second entity 136 depends on the surface property desired. Nanopore 130 is of truncated conical shape with the radius of orifice 134 smaller than the radius of base 122. The radius of orifice 134 is typically ranging from 2 nm to 30 μm. The depth, designated as d in FIG. 2, is typically ranging from 10 nm to 100 μm.

Figure 1:
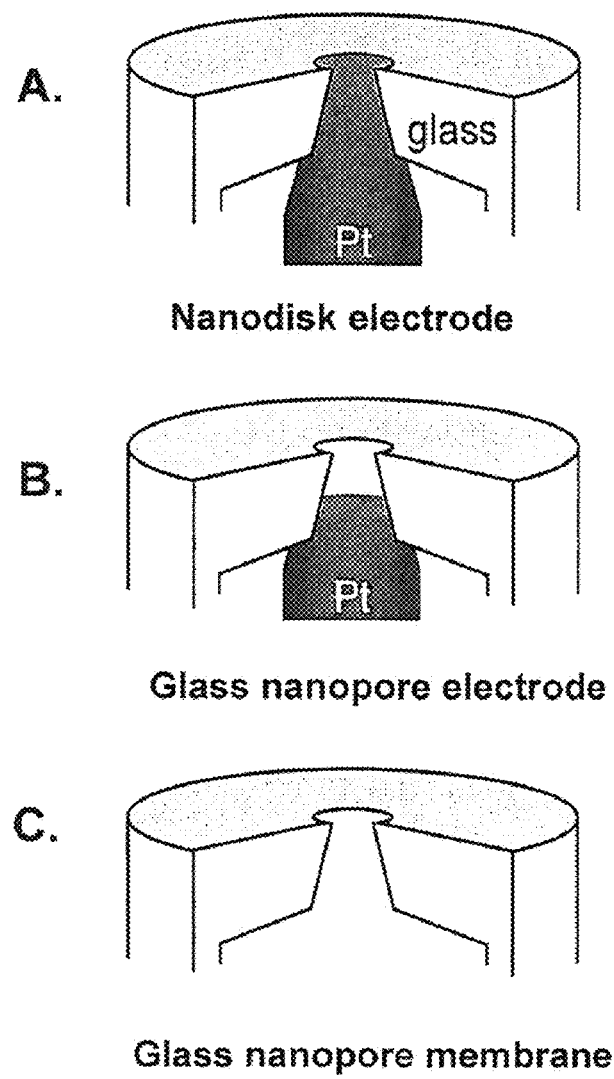
FIG. 1 (A) depicts a nanodisk electrode.

The geometry of a truncated cone-shaped nanopore electrode, shown in FIGS. 2(A) and (B), is further illustrated in FIG. 2(C). Nanopore 130 can be characterized by any three of the following four parameters: the depth of the pore, d, the radius of the Pt disk (e.g., base 122 in FIG. 2(A)) at the bottom of the pore, $a_p$, the orifice radius, a, and the half-cone angle Θ. The angle Θ is determined by the cone angle of the etched Pt wire before it is sealed in glass, which is readily measured by optical microscopy to within 1° as described in Zhang et al., Anal. Chem. 2004, 76, 6229-6238. The radius of the orifice, a, is equal to the radius of the exposed Pt disk (e.g., Pt disk in FIG. 1) prior to etching the Pt.

Figure 3:
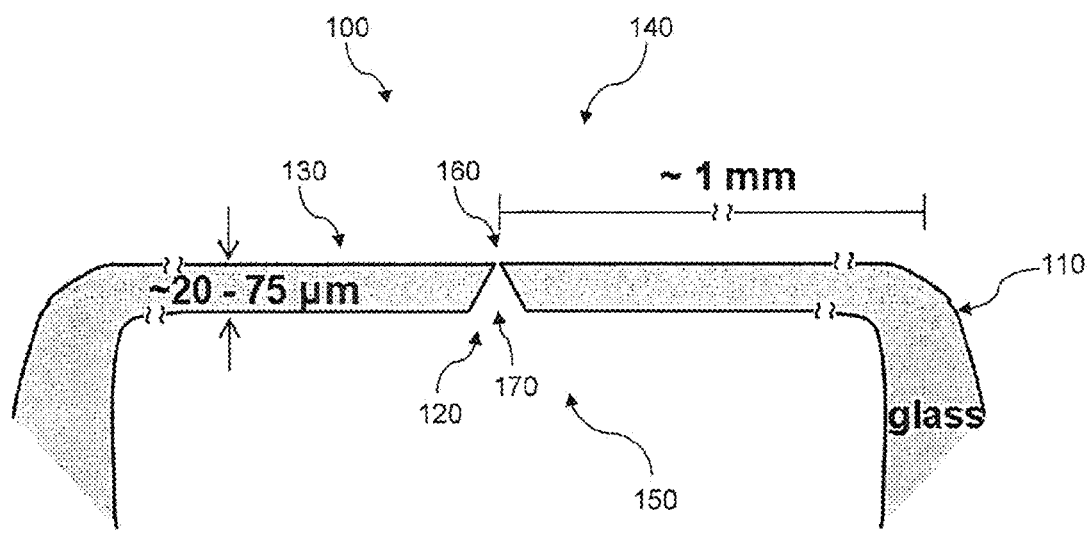
FIG. 3 is a schematic of a conical shaped nanopore in a thin glass membrane.

FIG. 3 is a cross sectional view of a truncated cone-shaped nanopore in a thin glass membrane. In FIG. 3, nanopore device 100 comprises glass capillary 110, and nanopore 120. Glass membrane 130 is an integral part of glass capillary 110. Glass membrane 130 has a first side 140 and a second side 150. Nanopore 120 extends through glass membrane 130, thus forms a channel connecting the first side and the second side of glass membrane 130. Nanopore 120 has first opening 160 facing the first side of glass membrane 130, and second opening 170 facing the second side of glass membrane 130. First opening 160 is smaller than second opening 170. Typically, first opening 160 is ranging from 2 nm to 500 nm; and second opening is ranging from 5 μm to 25 μm. The thickness of glass membrane 130, also the length of nanopore 120 in this case, is ~20-75 μm.

Figure 4:
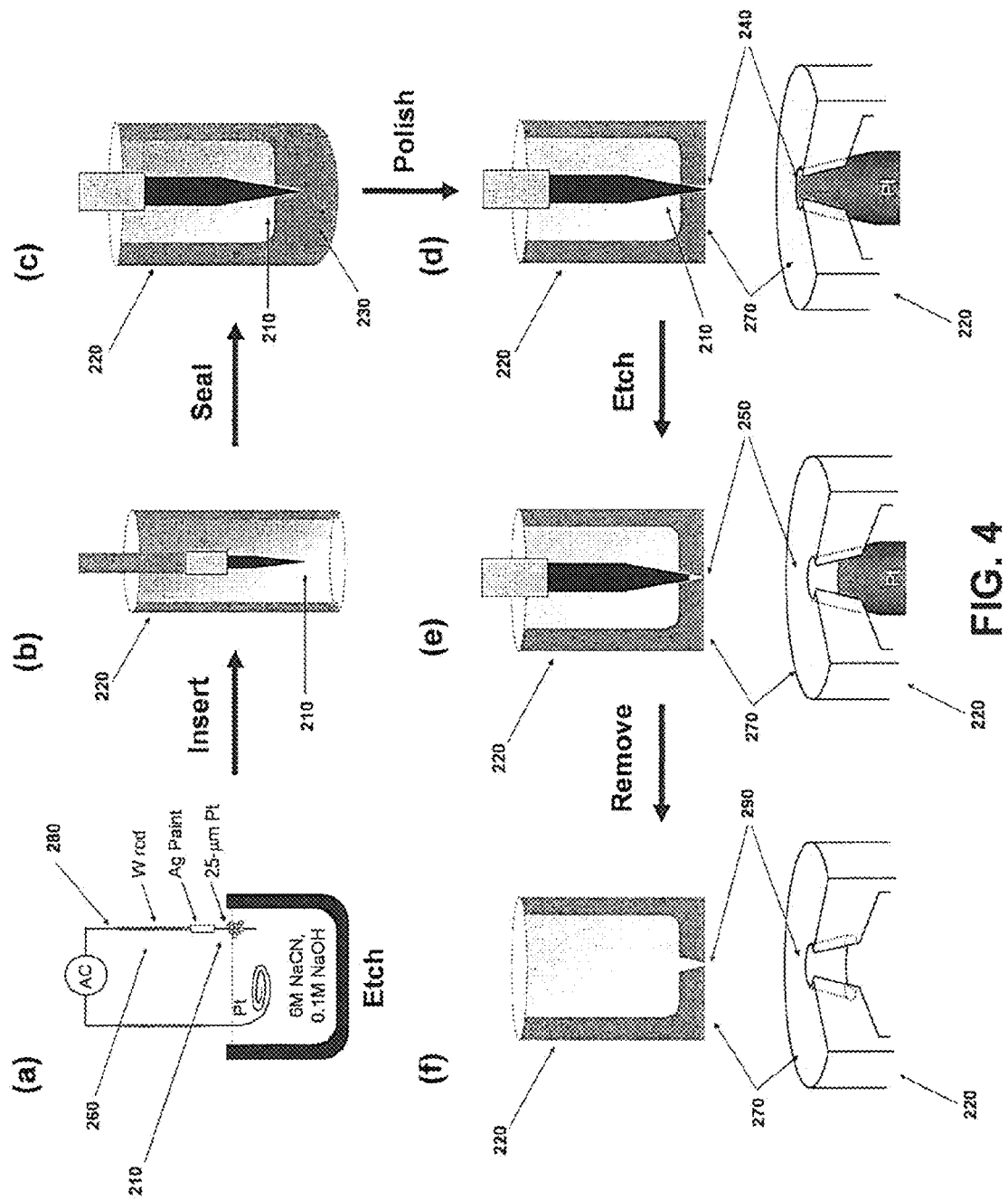
FIG. 4 illustrates procedures of preparing a glass nanopore membrane: (a) preparation of Pt tip, (b) insertion of a Pt ISTE into a glass capillary, (c) sealing of the Pt ISTE, (d) polishing of the glass capillary to produce a nanodisk electrode, and (e) etching of the Pt ISTE to produce a nanopore electrode, and (f) removal of the ISTE to produce a nanopore membrane.

General procedures of preparing a glass nanopore membrane are schematically depicted in FIG. 4. Preparations of nanodisk electrodes, nanopore electrodes and nanopore membrane are further illustrated using Examples herein. The preparation for a nanopore membrane typically involves four major steps: preparing an ISTE with a cone-shaped tip, sealing the tip of the ISTE in a glass substrate, polishing the substrate until the tip is exposed to produce a nanodisk electrode, etching the tip the ISTE to produce a nanopore electrode, and removing the ISTE to produce a nanopore membrane. In FIG. 4 (a), electrode 280 comprises Pt wire 210 which is attached to W rod 260 via Ag paint. Pt wire 210 is electrochemically etched to produce a sharp tip. In FIG. 4 (b), electrode 280 with sharpened Pt tip 210 is inserted inside glass capillary 220. In FIG. 4 (c), glass capillary 220 is sealed to produce bottom wall 230 in which Pt tip 210 is embedded. In FIG. 4 (d), sealed bottom wall 230 of capillary 220 is polished until Pt disk 240 is exposed. In FIG. 4 (e), exposed Pt disk 240 is electrochemically etched to produce a nanopore. In FIG. 4 (f), the Pt wire is removed by gently pulling the W rod (connected to the Pt) or by electrochemical or chemical etching of the Pt wire.

The size of the orifice of a nanopore (e.g., orifice 134 as shown in FIG. 2(A), or first opening 160 in FIG. 3, can be controlled by controlling the size of the exposed disk of an ISTE. To aid polishing an electrical continuity circuit may used to signal the exposure of the metal during polishing. The circuit can be designed such that a user is alerted at precisely the moment that the disk of the ISTE is first exposed during polishing. One way to accomplish this is to analyze the electrical continuity between the ISTE sealed in the substrate and a polishing means such as an electrolyte-wetted polishing cloth, e.g., analyzing the electrical resistance as function of the thickness of the substrate above the tip of the ISTE during polishing. The combined resistance of the ISTE, the substrate, and the polishing cloth is referred to herein as the resistance of the polishing circuit. The total resistance between the ISTE embedded in the substrate and the substrate surface in contact with the polishing cloth may be computed using finite element simulations, which enables estimation of the size of the exposed disk during polishing. The method of using finite element simulations to aid controlling of the disk size is further demonstrated in the accompanying example.

Figure 5:
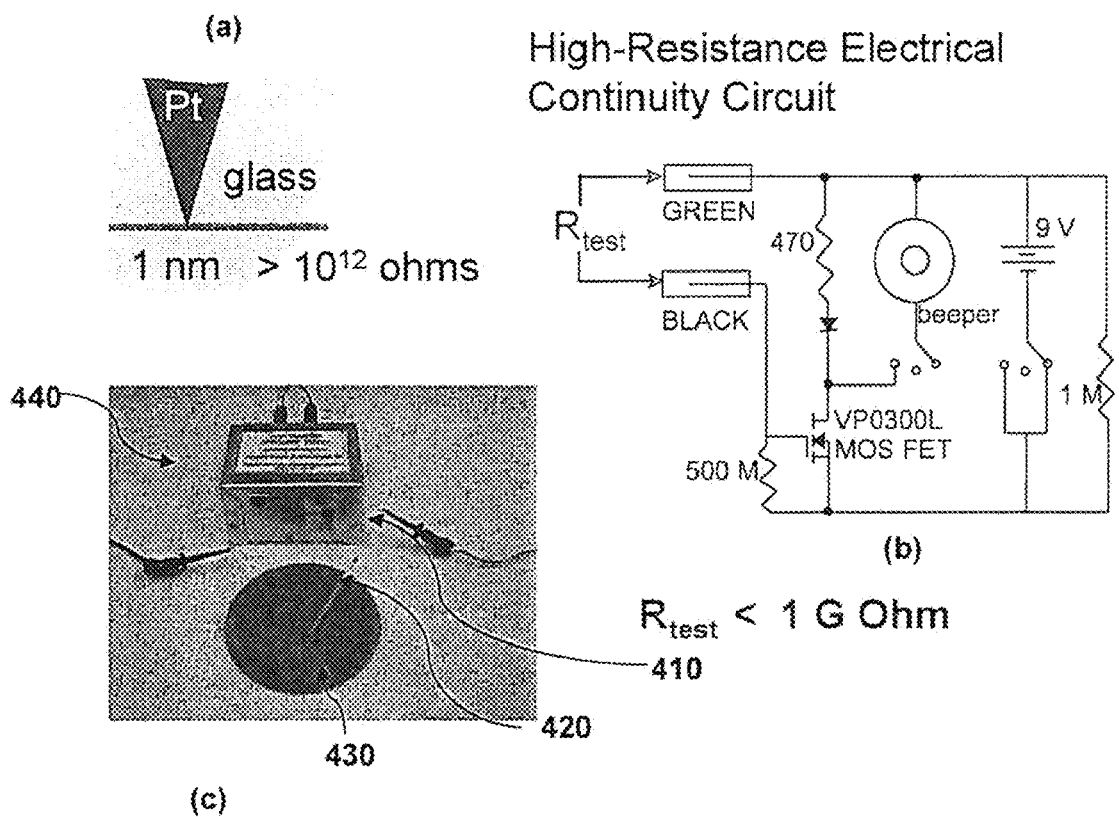
FIG. 5 (a) is a schematic of a Pt ISTE sealed in a glass membrane.

FIG. 5 depicts an electrical feedback circuit that can be used to control the size of a nanopore. As shown in FIG. 5 (c), electrode 410 comprises a Pt tip with an extended W rod, wherein the Pt tip is sealed in glass capillary 420. Glass capillary 420 is initially sanded using 400, 800, 1200 grit papers until ~0.5 μm of glass remained above the Pt tip. Glass capillary 420 is then polished on felt polishing paper wetted with an aqueous slurry of polishing powder containing an electrolyte, e.g., 0.1 M KCl. An electrical continuity measurement using device 440, which may be based on a MOSFET "on/off" switching circuit, is made to determine when the DC resistance between the W rod extending from the top of the capillary and the wetted polishing cloth decreased below 1-2 GΩ, signaling exposure of the Pt tip. Polishing is immediately ceased at this point. The 1-2 GΩ resistance has been empirically determined to yield exposed Pt disks (e.g., Pt disk 240 in FIG. 4) with electrochemically-determined radii in the range 2 to 30 nm. The signal resistance and circuit may be modified to produce exposed Pt disks of different radii, and thus provide control of the size of the orifices.

Figure 6:
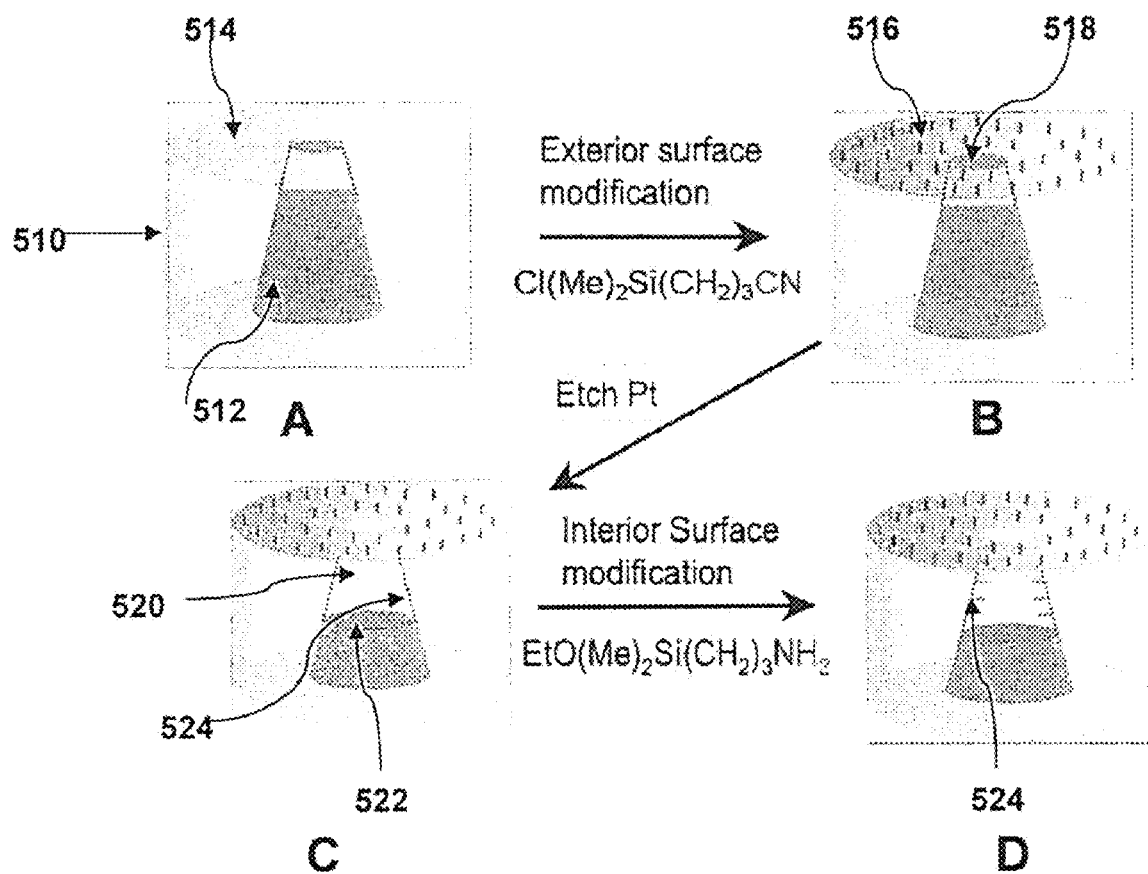
FIGS. 6A-6D illustrate chemical modification of the exterior and interior surface of a nanopore electrode.

An example of chemical modification of the exterior and interior surface of a nanopore electrode is depicted in FIG. 6. In FIG. 6(a), Pt wire 512 with a conical tip is sealed in glass substrate 510. Surface 514 is polished to produce exterior surface 516 and to expose Pt disk 518, as shown in FIG. 6(b). Exterior surface 516 is first protected by covalent attachment of an alkane silane that possesses a terminal "inert" functionality. The purpose of inert terminus of this monolayer is to prevent binding or specific interaction of molecules and analytes with the exterior surface. Exposed Pt disk 518 is then electrochemically etched to produce pore 520 which results in Pt disk 522 at the pore base. Pt disk 522 serves as an electrical signal transducer for electrochemical or conductivity measurements. Interior surface 524 of the glass pore is then modified to introduce binding sites or chemical functionality that responds to external stimuli. For example, an —NH2 terminating silane may be attached to interior surface 524, as the amine group is a convenient starting point for coupling to analyte-specific ligands.

Some embodiments of the invention are disclosed in Zhang, *Anal Chem.*, 2004, Zhang, *Anal Chem.*, 2006; Zhang, *JPC*, 2006, Wang, *JACS* 2006, White, *Langmuir,* 2006.

The invention is further described with the aid of the following illustrative Examples.

EXAMPLES

Fabrication of glass nanodisk electrodes, glass nanopore electrodes, and glass nanopore membrane.

Electrochemical Etching of Au and Pt Tips A 2-cm length of Pt or Au wire is connected to a W rod using Ag conductive epoxy (DuPont). The Pt/W or Au/W ensemble is heated in an oven at 120° C. for about 15 minutes to dry the Ag epoxy. The end of the Au or Pt wire is electrochemically etched to a sharp point in 6 M NaCN/0.1 M.NaOH solution following standard methods reported elsewhere ((a) Melmed, A. J. *J. Vac. Sci. Technol. B* 1991, 9, 601. (b) Melmed, A. J.; Carroll, J. J. *J. Vac. Sci. Technol. A* 1984, 2, 1388). Briefly, a 100-300 Hz AC voltage (~4 V amplitude) is applied between the Pt or Au wire and a large area Pt electrode using an Agilent 33220A function/arbitrary generator. Bubbles formed at the metal/solution interface during electrochemical etching; the applied voltage is removed immediately upon cessation of bubbling and the sharpened wire is washed with $H_2O$. Pt tips were further sharpened, as described herein below, using a custom-designed waveform generator.

Figure 7:
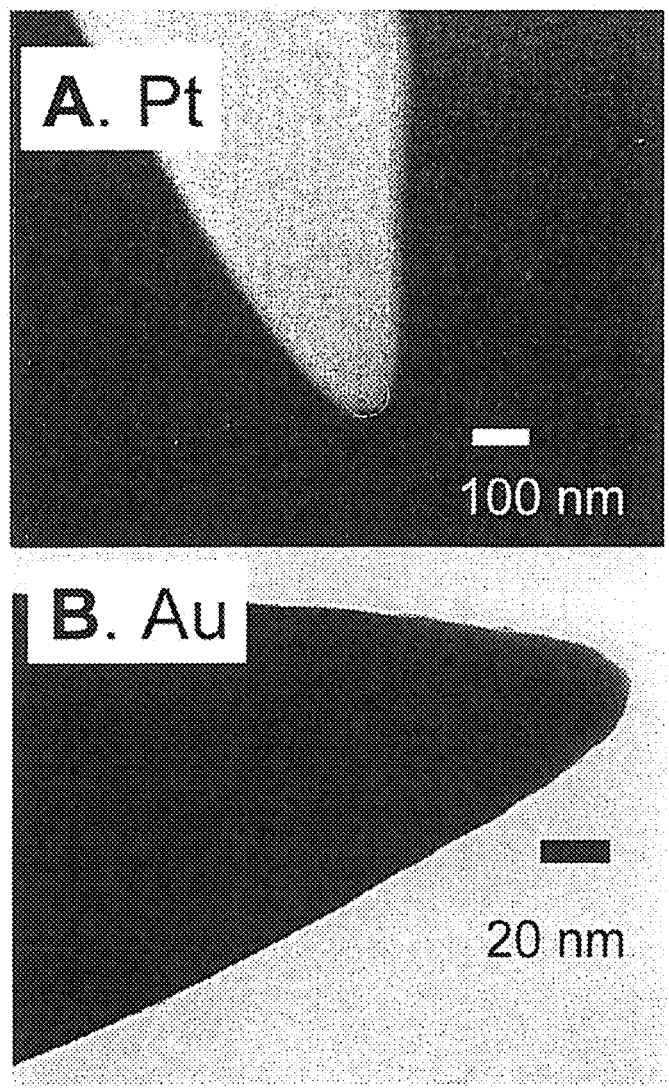
FIG. 7. Electron microscopy images of (A) Pt (SEM) and (B) Au (TEM) wires after etching in 6 M NaCN/0.1 M NaOH.

FIG. 7 shows electron micrographs of Pt and Au tips after etching in 6 M NaCN/0.1 M NaOH. Although similar conditions are used (e.g., ~180 Hz, 3.6 V for Pt, 4.5 V for Au), the etching of Au wires yields tips with significantly smaller radii of curvature (<10 nm) than Pt (~30 nm).

Systematic studies revealed several important correlations. First, larger diameter metal wires result in higher diameter cone-angles at the tip. For example, etching a 25-μm-diameter Pt wire yields tips with half-cone angles of 8.5±1°, while etching a 100-μm-diameter Pt wire yields tips with half-cone angles of 14±1°. The ability to control the cone angle of the tip is of practical utility, as the transport resistance of the glass nanopores is sensitive to this parameter. Second, the surface roughness of the etched metal tips, especially for Pt, is very dependent on the frequency of the applied AC voltage. Higher frequencies yield significantly smoother surfaces. However, the frequency of the etching voltage are preferably less than 1000 Hz in order to produce sharp tips. Empirically a frequency-range of 110-300 Hz yields tips that are satisfactory for producing nanodisks.

Figure 8:
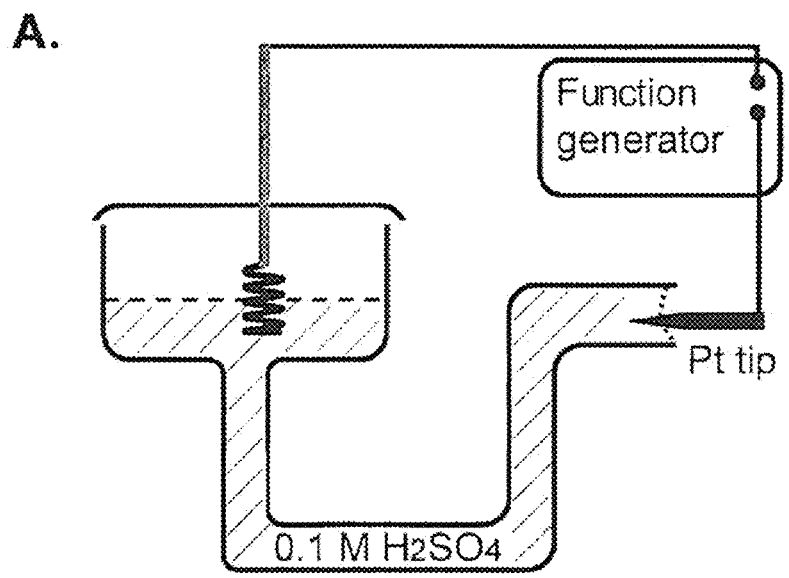
FIG. 8. (A) Schematic of a cell and (B) pulse waveform for preparing ultra-sharp Pt tips.
Figure 8:
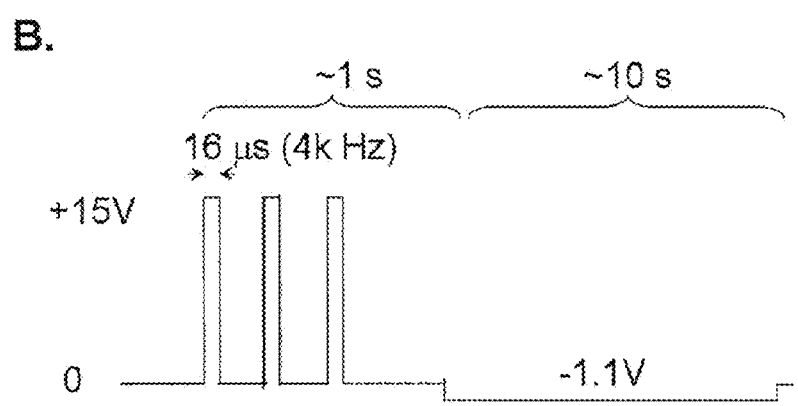

Electrochemical Sharpening of Pt Tips Nanodisk electrodes with radii between 30 and 100 nm can be fabricated using Pt tips sharpened as described above. To fabricate even smaller Pt electrodes, the procedure described by Libioulle et al. (Libioulle, L.; Houbion, Y.; Gilles, J.-M. *Rev. Sci. Instrum.* 1995, 66, 97) for sharpening Pt tips for use in STM was adopted, with a few modifications. FIG. 8A shows a U-shaped electrochemical cell that is employed for this purpose. This cell has a large reservoir on the left-hand side that is used to position the air-solution (0.1 M $H_2SO_4$) interface in the horizontal glass tube at right. The end of an etched Pt tip is inserted orthogonally across the meniscus of the 0.1 M $H_2SO_4$ within the horizontal glass tube. A pulsed voltage waveform is then applied to electrochemically sharpen the tip further. A 4 kHz, 15 V, 16 μs pulse waveform was applied for 1 s with a homebuilt waveform generator, followed by a DC potential of −1.1 V for 10 s to remove any $PtO_x$. The voltage program as a function of time is represented in FIG. 8B. Repetition of the program was carried out three times in succession to obtain sufficiently sharp tips for electrode fabrication.

Figure 9:
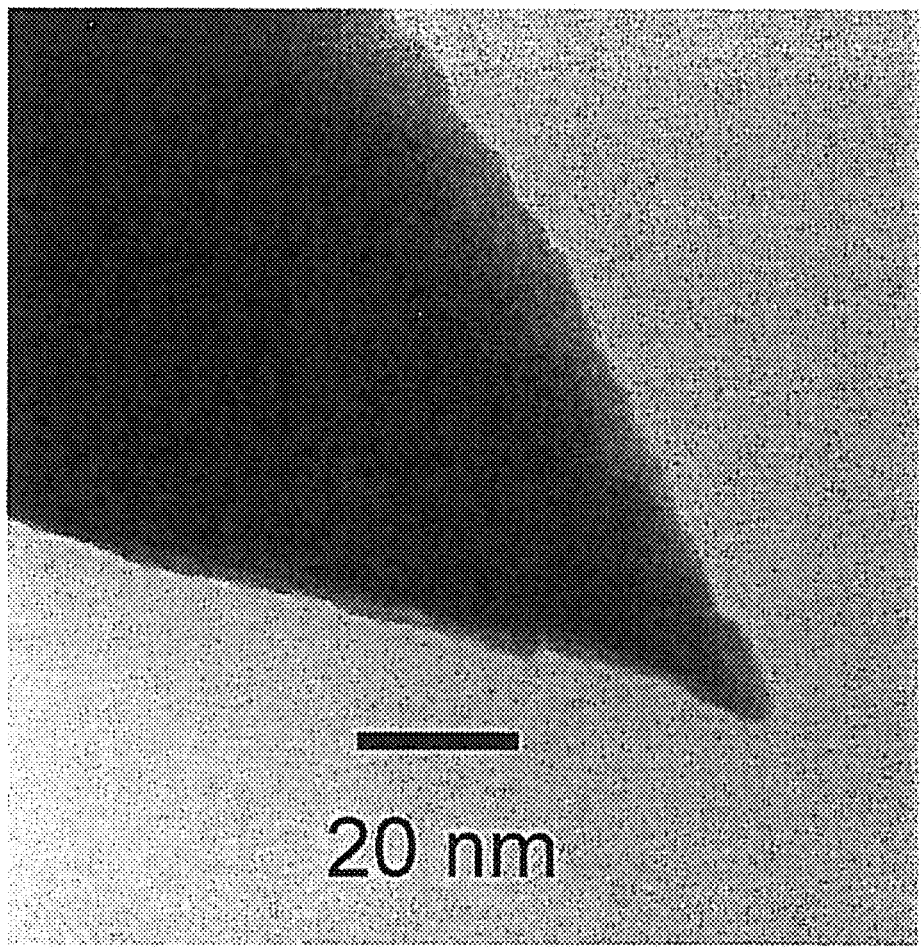
FIG. 9. High-resolution TEM image of a Pt tip following sharpening in 0.1 M $H_2SO_4$.

FIG. 9 shows a TEM image of a typical Pt tip sharpened by the procedure outlined herein above. The radius of curvature of the tip is ca. 2 nm and the surface appears free from oxide deposits. TEM characterization indicates that the majority of Pt tips processed using the program in FIG. 8B have radii <10 nm.

Sealing Pt and Au Tips in Glass The sharpened end of the Pt or Au wire is inserted into a glass capillary, leaving ~3 mm between the tip and the end of the glass tube. The wire is then sealed into glass tube by slowly softening the capillary in a $H_2$—$O_2$ flame. An optical microscope is used to frequently check the quality of the seal during this process (e.g., to ensure that no air bubbles became trapped near the metal tip). After obtaining an acceptable seal, the top of the W rod is secured to the glass capillary with epoxy (Dexter). Rough polishing to remove a large portion of the glass (e.g., by leaving ~100 μm between the metal tip and the outside edge of the capillary) is accomplished using fine sand paper or emery cloth. Final polishing to expose the Pt or Au disk is performed using a wetted Buehler MICROCLOTH™ polishing pad mounted on a green glass plate with the aid of an electrical continuity tester as described herein below.

Two primary conditions must be met in order to seal the metal into a glass capillary without destroying the ultra-sharp Pt and Au tips. First, the thermal expansion coefficient of the glass should be equal or greater than that of the metal to prevent crevice formation upon cooling. Secondly, the sealing temperature must be much lower than the melting point of the metal in order to avoid changes in tip shape. Thus, the softening temperature of the glass should be significantly lower than the melting point of the metal.

Table 1 lists the melting points and linear expansion coefficients of the metals and glasses used in this study. The melting point of Pt (~1770° C.) is ~1000° C. higher than the softening point of either soda lime or Pb-doped glass, and the expansion coefficients of Pt and both glass types are comparable. These conditions indicate that Pt is well suited for sealing in either type of capillary. Although Au has a significantly higher thermal expansion coefficient than either soda lime or lead glass, and a melting point (~1060° C.) that is only 300-400° C. higher than the glass softening points, we have successfully sealed Au in Pb-doped glass capillaries (as judged from the voltammetric response).

TABLE 1

Melting/Softening Points and Expansions Coefficients of Pt, Au, and Glasses.

| Material | Melting/Softening Point ° C. | Linear Thermal Expansion Coefficient (25° C.) (×10$^6$) K$^{-1}$ | Electrical conductivity (Ωm)$^{-1}$ |
|---|---|---|---|
| Platinum | 1769 | 9 | $9.3 \times 10^6$ |
| Gold | 1064 | 14 | $4.4 \times 10^7$ |
| Soda Lime Glass | ~700 | 9.3 | ~$10^{-10}$ |
| Pb-doped Glass | ~600 | 9.5 | ~$10^{-14}$ |

Polishing of Glass Electrode To aid hand polishing, a high-input impedance (MOSFET)-based electrical continuity circuit is used to signal the exposure of the metal during polishing. The electrical continuity between the Pt or Au wire sealed in glass and the felt polishing cloth (wetted with a KCl solution and connected to the external circuit with a metal clip) is measured. The successful implementation of this strategy hinges on designing the circuit such that the user is alerted at precisely the moment that the metal is first exposed during polishing. One way to accomplish this is to utilize an analysis of the electrical resistance as function of the thickness of the glass above the tip during polishing. The combined resistance of the Pt wire, the glass, and the electrolyte-wetted polishing cloth is referred to here as the resistance of the polishing circuit.

The total resistance between the Pt wire embedded in the glass and the flat glass surface in contact with the polishing cloth is computed using finite element simulations. The electrical conductivity of glass is set at $10^{-10}$ (ohm·m)$^{-1}$, typical of soda lime glass (Table 1) and approximately 17 orders of magnitude lower than Pt. Prior to Pt exposure, the glass layer between the metal and the polishing cloth is by far the dominant resistance (the resistance of the solution can be ignored). Upon exposure of the tip, the spreading resistance at the nanodisk/electrolyte interface becomes controlling, and computed using the equation: (Bard, A. J.; Faulkner, L. R. *Electrochemical Methods: Fundamentals and Applications;* 2nd Edition, 2001)

$$R = (4\kappa a)^{-1} \tag{1}$$

where κ is the conductivity of the 0.02 M KCl solution (κ~0.14 (ohm m)$^{-1}$) on the polishing cloth and a is the radius of the metal disk. Other KCl concentrations and different electrolytes can be employed for polishing using the electrical feedback circuit. Since the voltage drop in the electrolyte occurs over a very small distance (~10a), it is not necessary to precisely model the electrolyte layer geometry on the polishing cloth.

Figure 10:
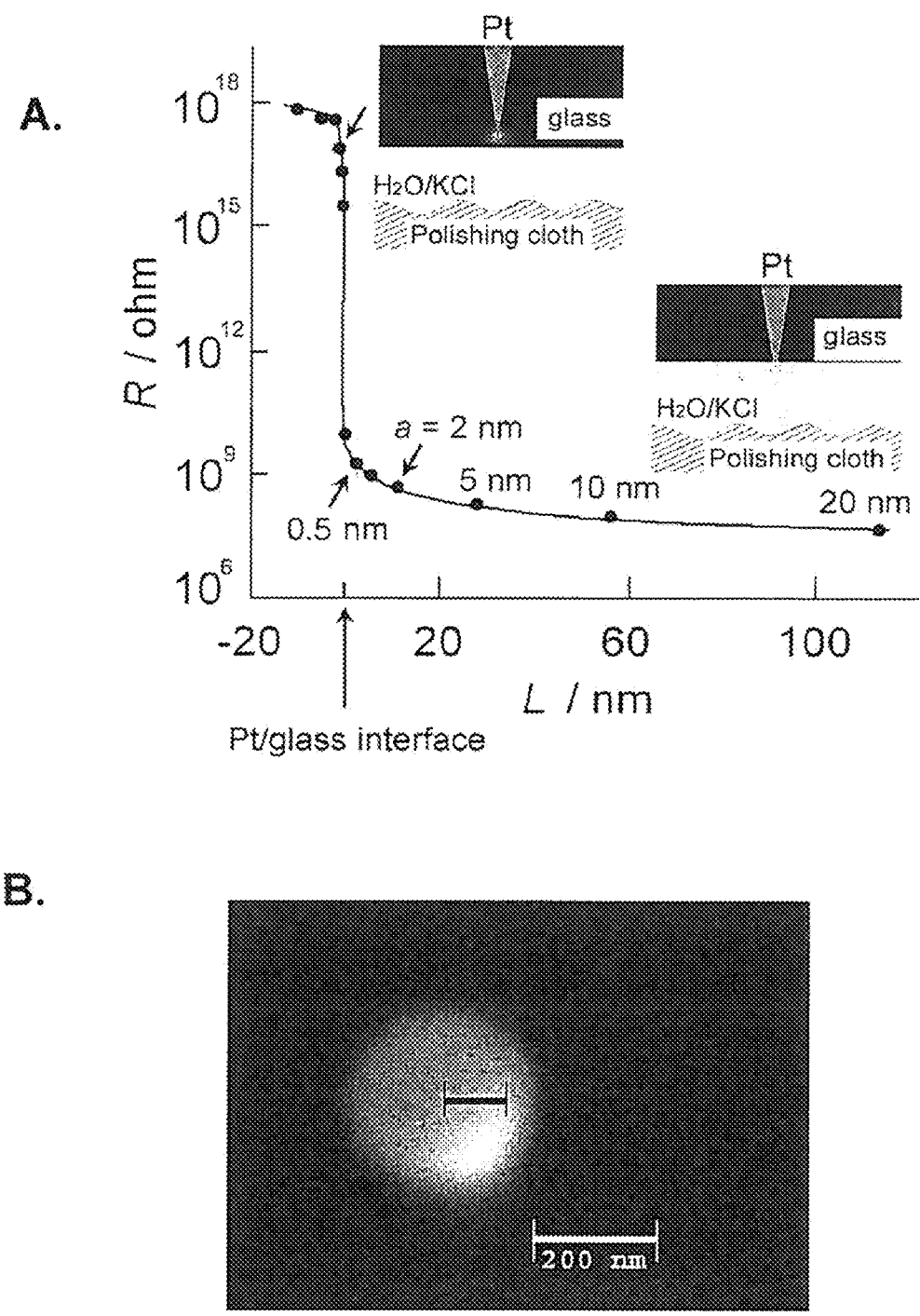
FIG. 10. (A) Resistance of a glass-sealed Pt disk electrode during polishing computed from finite-element simulations. Inserts depict the potential distribution before and after exposure of the Pt disk. (B) SEM of resulting disk electrode prepared using the finite element simulations and high-sensitivity electrical circuit for controlling the radius of the Pt disk FIG. 11. (A) Circuit diagram of the high-sensitivity electrical continuity tester for detecting first exposure of Pt. (B) Circuit diagram of the high-sensitivity electrical circuit for controlling the radius of the Pt disk. $R_G$ is a variable resistor that allows selection of the disk radius.

FIG. 10 shows a plot of the logarithm of the polishing circuit resistance (log R (Ω)) as a function of the polishing depth, L (nm). The value of L=0 corresponds to the glass surface aligned with the end of the metal tip. Thus, negative values of L correspond to the thickness of the glass layer before the tip is exposed, while positive values correspond the thickness of the glass removed following tip exposure. A geometric analysis can be used to convert L values to the exposed disk radius (a; selected a values are shown in FIG. 10). Thus, in principle, measurement of the polishing circuit resistance enables estimation of the size of the metal disk during polishing.

To obtain real-time feedback, a MOSFET circuit as a DC continuity tester is used to determine the moment during polishing when the metal tip becomes exposed. From the simulations in FIG. 10A we can define continuity as a decrease in R from ~$10^{18}$Ω (immeasurable) to ~$10^9$Ω. A notable progression is R=8.9 GΩ for a=0.1 nm, 4.5 GΩ when a=0.2 nm, and 1.8 GΩ at a=0.5 nm. In the circuit described herein below, electrical continuity is signaled when R=~2 GΩ, corresponding to a metal nanodisk with a ~0.5 nm (exposure of ~10 metal atoms of radius 0.15 nm in a circular disk would meet this criteria). FIG. 10B shows a SEM of a Pt disk exposed at the surface of glass produced by this method.

Figure 11:
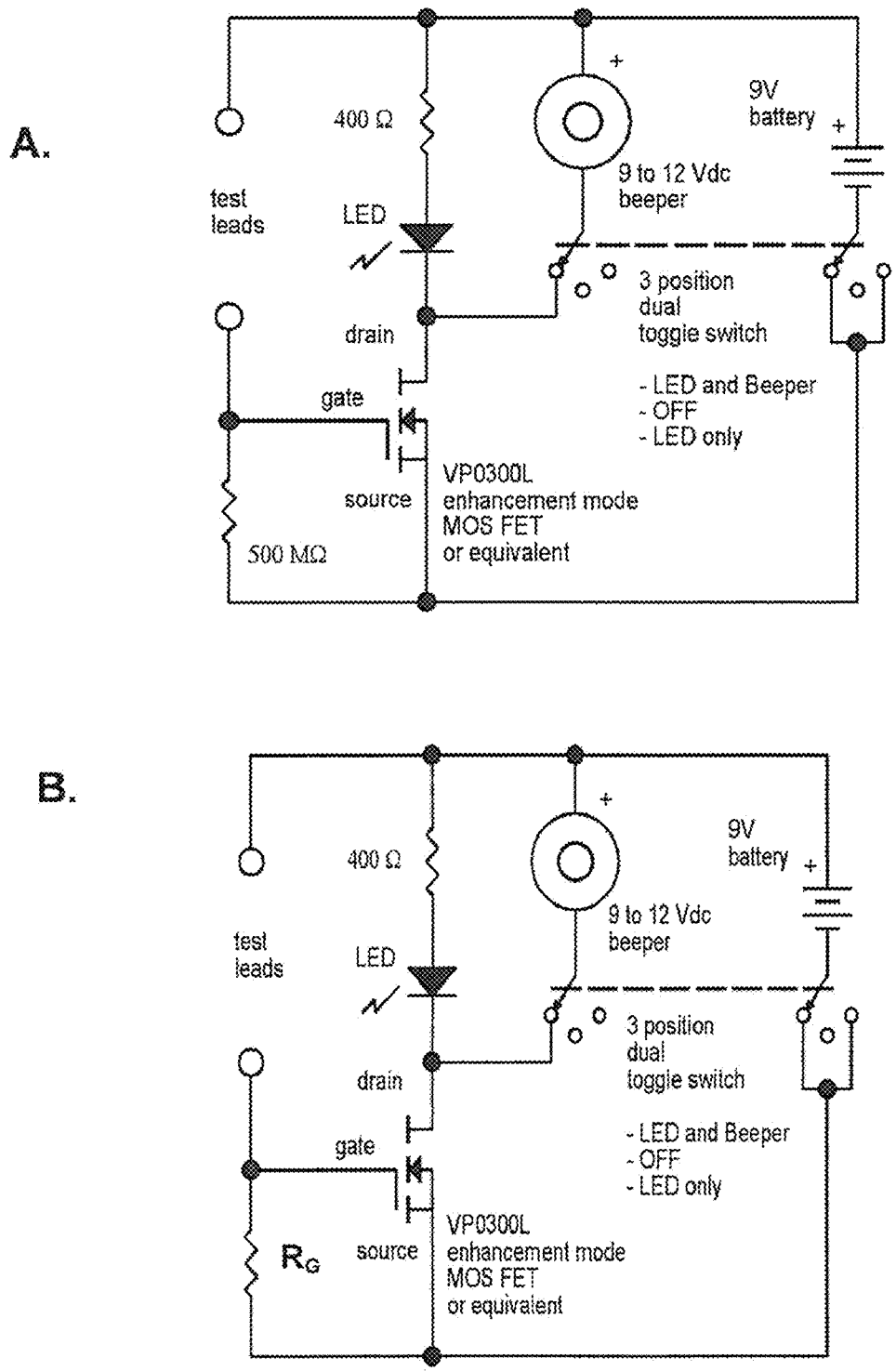

A circuit diagram of the continuity tester is shown in FIG. 11A. A resistance of less than ~2 G ohms is indicated by an audio signal and/or lighted LED. Although a more sensitive tester could be developed, such high sensitivity devices are susceptible to false readings due to very small leakage currents through surface contamination of the test leads, and through conduction or tunneling across the nanometer-thin glass layer just prior to exposing the tip.

The signaling mechanism consists of a solid-state beeper and an LED, which are both connected between the +9V battery terminal and the drain lead of a VL0300L MOSFET transistor. The source lead of this transistor is connected to the negative terminal of the battery. The test leads are connected such that the transistor acts as a switch in the circuit; when a complete circuit is created by a resistance of less than ~2 GΩ between the test leads, the beeper will sound and the LED will turn on. This is accomplished by attaching one test lead directly to the +9V battery terminal and the other to the transistor gate via a 500 MΩ resistor that is wired in series to the negative battery terminal. If there is sufficient continuity through the test leads, a 1.5 V drop across the 500 MΩ resistor will activate the transistor. The enhancement mode FET is normally off, and therefore the beeper and LED are normally off. However, ~1.5V at the gate of the FET activates the transistor and therefore sets off the beeper and the LED.

In operation, one test lead is connected to the W rod that contacts the Pt or Au wire embedded in the glass capillary, and the other lead is bathed in the solution on the polishing cloth. When enough glass has been polished to just barely expose the Pt/Au tip, sufficient current will flow through the probe, causing a voltage drop across the 500 MΩ gate resistor, which in-turn activates the transistor.

Upon first exposure of the metal, an intermittent audio or LED signal occurs, which is possibly due to capacitive currents. An additional few seconds of polishing results in a continuous signal that is probably associated with oxidation or reduction of $H_2O$ or other redox active constituents of the electrolyte ($Cl^-$, $O_2$) that wet the polishing cloth.

The polishing circuit of FIG. 11A can be modified by replacing the 500 MW resistor with a variable resistor $R_G$ as shown in FIG. 11B. This results in an electrical, optical or audio signal to the polisher that a disk electrode of size, determined by the calculations in FIG. 10A and the value of $R_G$, has been produced. Polishing is immediately ceased upon indication of the desired disk size either by the LED or audio signal.

The radius of the exposed metal disk can be determined by several means, including: steady-state voltammetry, atomic force microscopy, conductance measurements (of the pore after removal of the metal), and electron microscopy. Nanodisk radii are measured by steady-state voltammetry, which is by far the least intensive method. Representative samples are also characterized by an additional method to establish correlations with the voltammetric measurements, ensuring mutual validity. In voltammetry, the radius of the nanodisk is assessed using the steady-state limiting current, $i_d$, for the oxidation of a soluble redox species through the equation (Saito, Y. *Rev. Polarog.* (Japan) 1968, 15, 177.)

$$i_d = 4nFDCa \tag{2}$$

where n is the electron stoichiometry, F is Faraday's constant, and D and C* are the diffusion coefficient and bulk concentration of the redox molecule, respectively. Values of a were determined by measuring $i_d$ for the oxidation of 5.0 mM ferrocene (Fc, $D=1\times10^5$ cm$^2$ s$^{-1}$) in acetonitrile (supporting electrolyte 0.2 M TBAPF$_6$).

Figure 12:
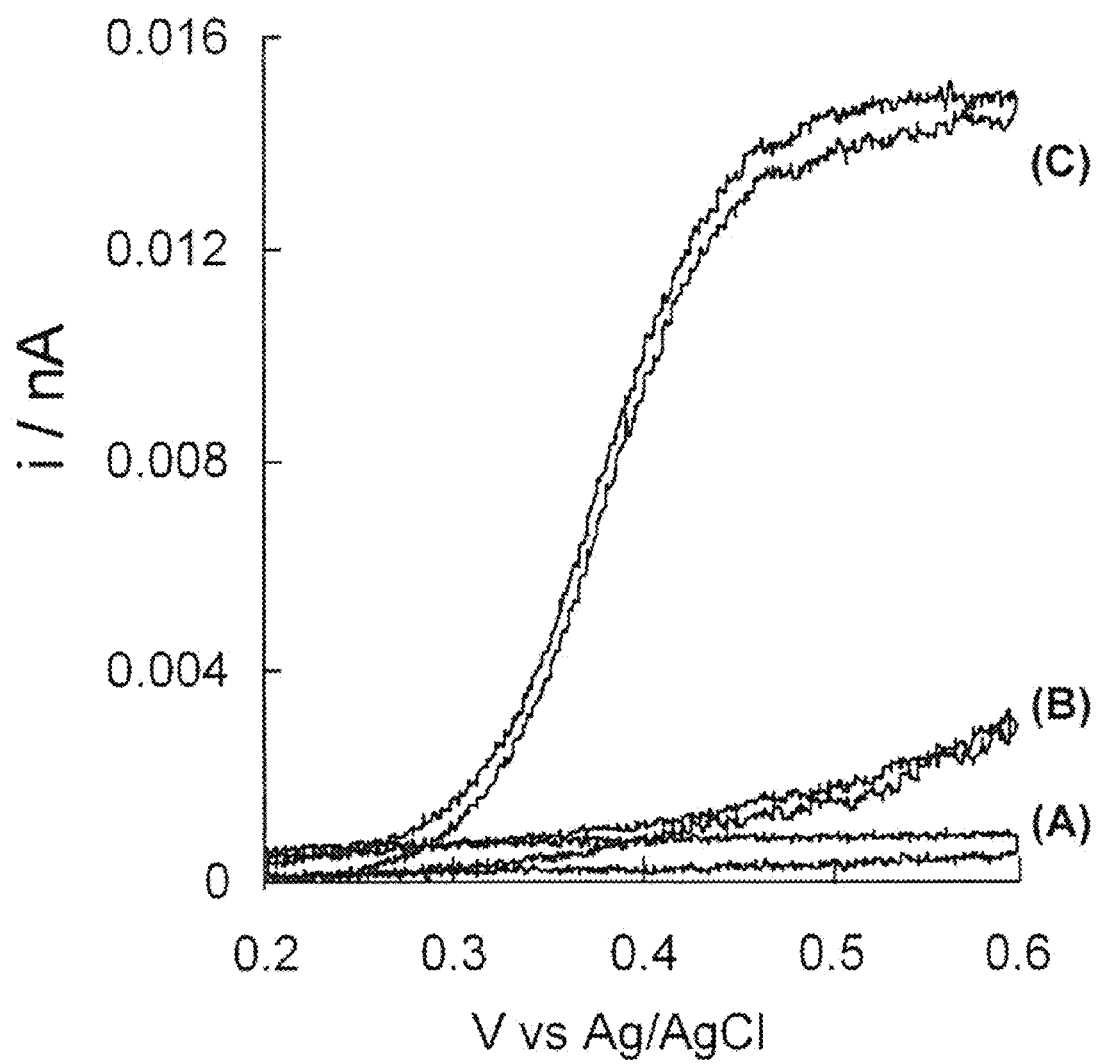
FIG. 12. A graph depicting voltammetric response of a Pt disk electrode in $CH_3CN$ containing 5 mM Fc and 0.2 M $TBAPF_6$ (A) before and after (B) initial Pt tip exposure (~0.4 nm radius), and (C) after further tip exposure to create a disk electrode.

FIG. 12 shows the voltammetric response of a Pt disk electrode in 5.0 mM Fc/0.2 M TBAPF$_6$ solution before tip exposure (A), immediately after the continuity tester signals exposure with intermittent beeping (B), and after sonicating the nanodisk in ethanol for ~20 s (C). Prior to exposure of the metal tip, there is a small charging current (~0.5 pA, FIG. 12A) that corresponds, at least partially, to the stray capacitance of the instrument. This background capacitance is observed whether or not the metal nanodisk is exposed, and appears even when the capillary and metal wire is removed entirely from the solution. The voltammetric curve in FIG. 12B shows an increase in current that is nearly exponential beginning near $E^{o'}$ (the thermodynamic redox potential). This current does not reach a diffusion-limited plateau and may arise from any combination of either (1) conductance or tunneling across a very thin glass layer (<1 nm) that remains above the Pt tip, or (2) kinetically controlled oxidation of Fc at a sub-nanometer-radius nanodisk. FIG. 12C shows that a voltammetric response exhibiting a well-defined diffusion-limited current plateau is obtained after a brief sonication of the electrode (5 s). Sonication is believed to remove any remaining glass at the electrode surface, albeit in an uncontrolled fashion. The voltammetric response after sonication corresponds to a radius ~4 mm.

Figure 13:
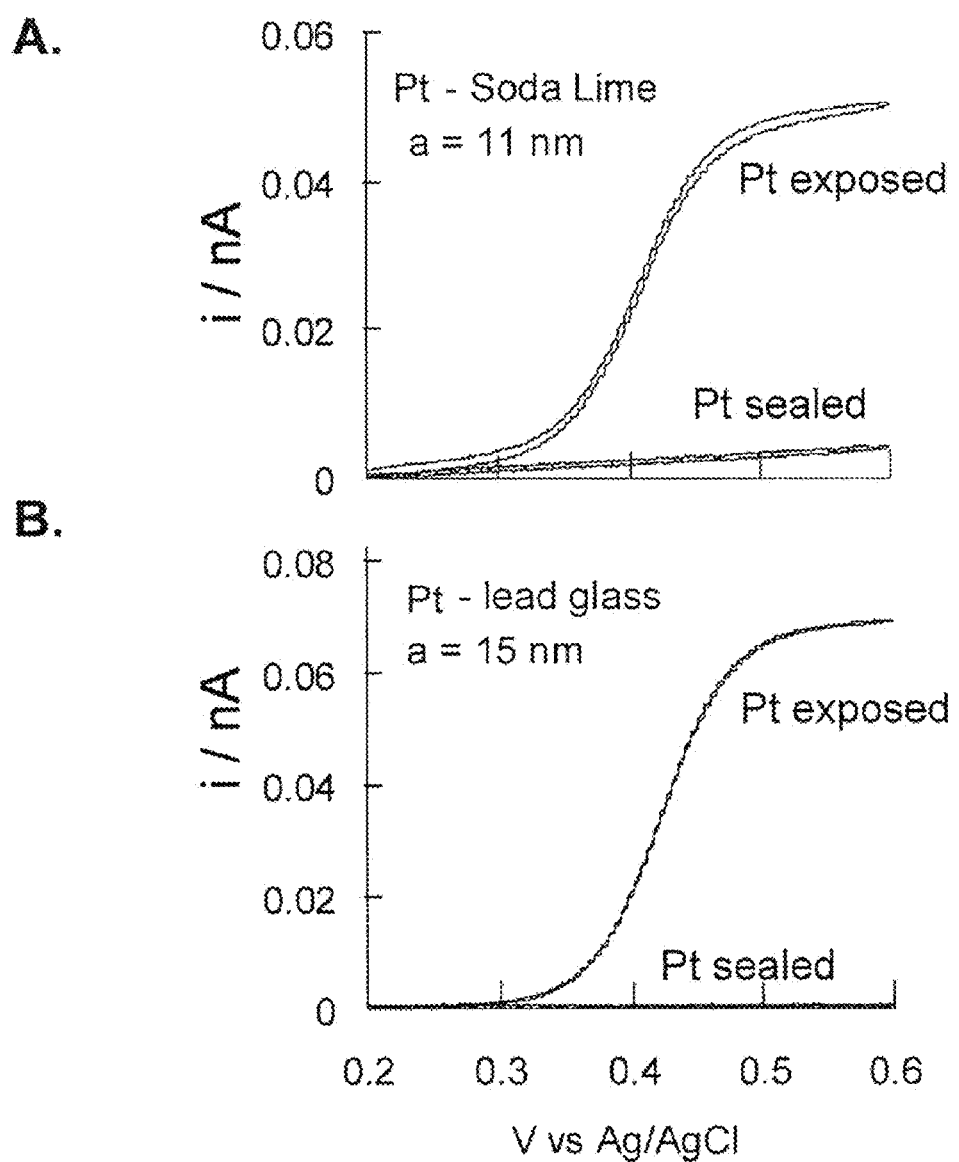
FIG. 13. Graphs depicting voltammetric responses of Pt nanodisk electrodes measured in $CH_3CN/0.2$ M $TBAPF_6$ in the presence and absence of 5.0 mM Fc. (A) 11-nm radius sealed in soda-lime glass and (B) 15 nm-seal in Pb glass (sweep rate=20 mV $s^{-1}$).
Figure 14:
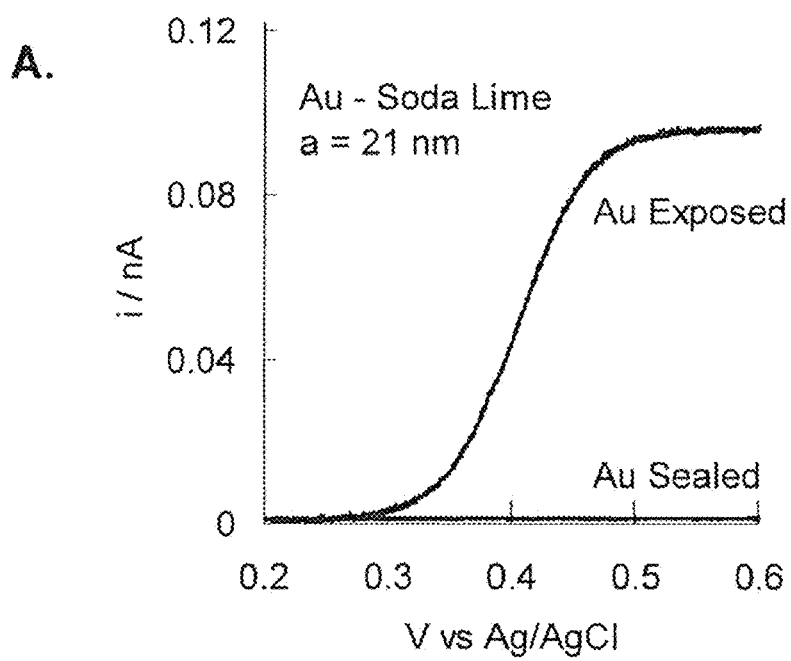
FIG. 14. Graphs depicting voltammetric responses of Au nanodisk electrodes measured in $CH_3CN/0.2$ M $TBAPF_6$ in the presence and absence of 5.0 mM Fc. (A) 21-nm radius sealed in soda-lime glass and (B) 49 nm-seal in Pb-doped glass (sweep rate=20 mV $s^{-1}$).
Figure 14:
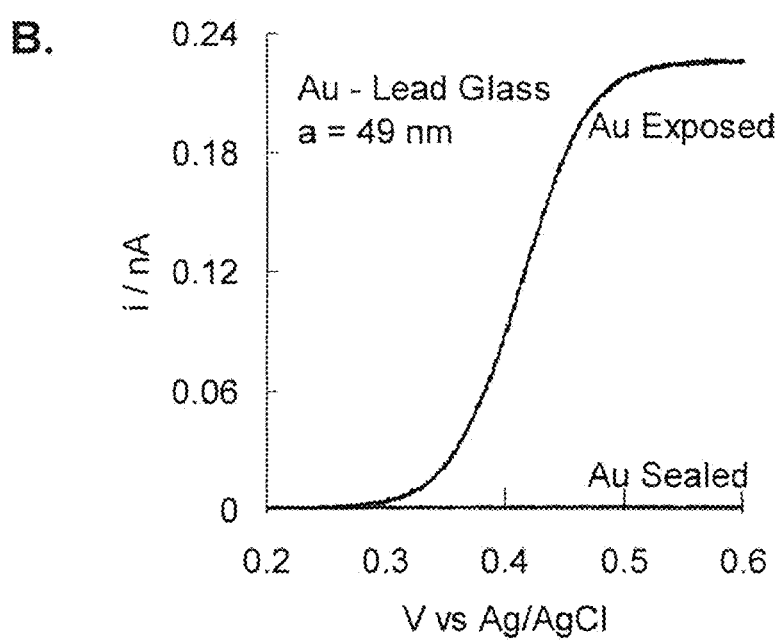

Continuing polishing briefly beyond the intermittent beeping stage (until a continuous audio alert is obtained) results in electrodes that give well-defined voltammetry. i-V curves in electrolyte only and 5.0 mM Fc solutions for two different Pt electrodes is presented in FIG. 13. These electrodes were prepared using soda lime glass (a=11 nm, FIG. 13A) and Pb-doped glass (a=15 nm, FIG. 13B). Similar voltammetric responses were obtained for glass-shrouded nanodisks prepared using sharpened Au wires, FIGS. 14A and 14B. Using the circuits in FIG. 11, we find that Pt and Au nanodisks with radii ranging between 2 and 25 μm can be routinely prepared, the majority of which exhibit nearly ideal voltammetric behavior (similar to the examples presented herein).

Close examination of FIG. 13 reveals a difference in the voltammetric response of the two Pt electrodes prepared using soda lime and Pb-doped glass capillaries. The i-V response of the Pt electrode shrouded in soda lime glass exhibits a significantly larger linear background slope (75 pA/V) than that of the Pb-doped glass (immeasurably small). This slope is not due to a poor glass/metal seal, but instead reflects the steady-state flux of Na$^+$ within the bulk soda lime glass. This supposition is supported by experiments in which a Pt wire is sealed entirely in soda lime glass (no polishing). The slopes of the i-V curves of these electrodes at any time during polishing, but before exposure, are indistinguishable. The conduction process due to the transport of Na+ within the glass appears superimposed on the voltammetric response for Fc oxidation. For example, in FIG. 13A the i-V curve for the sealed Pt shows a larger hysteresis than the corresponding i-V curve in FIG. 13B, for an electrode sealed in Pb-doped glass. This effect is readily detectable due to the high current sensitivity used in recording the data. The reproducible absence of an ohmic background when using Pb-doped capillaries is consistent with the much lower ionic conductivity of Pb-doped glass relative to soda lime glass (see Table 1).

As previously discussed, electron microscopy has been used to measure the radii of our Pt nanodisk electrodes (as well as nanopore electrodes synthesized from nanodisks, see below). In general, we find good agreement between SEM-determined radii and voltammetric results. AFM imaging and conductivity measurements of nanopore electrode orifices prepared from the nanodisk electrodes yield radii in excellent agreement with values from voltammetric measurements.

Figure 15:
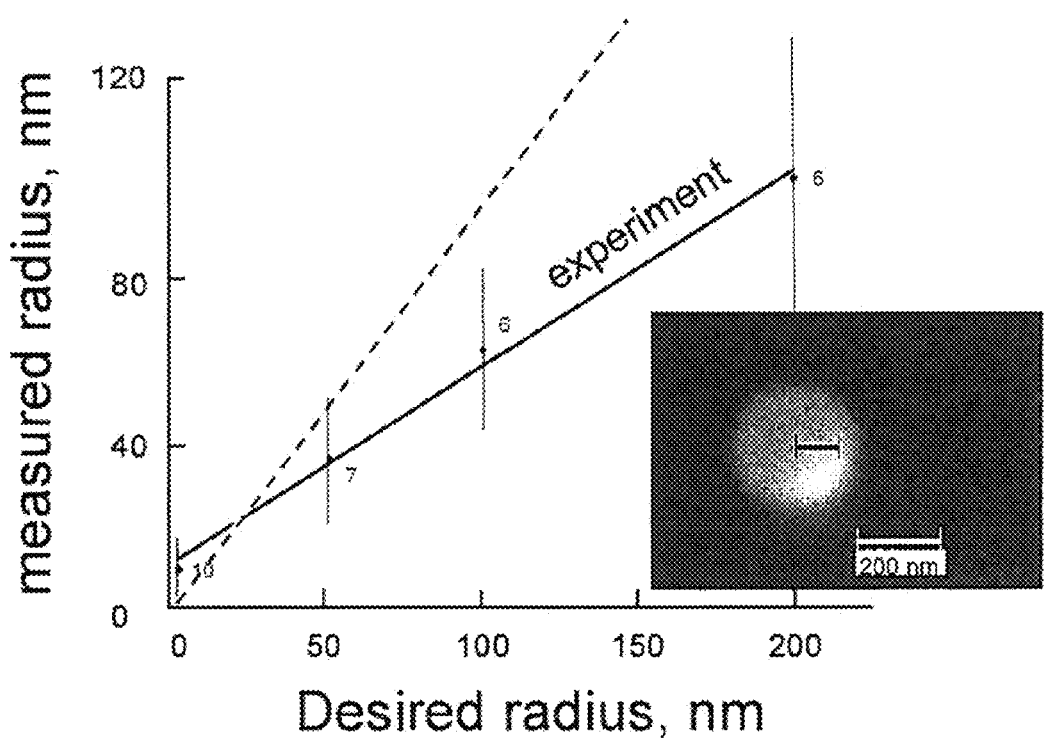
FIG. 15. Plot of experimentally measured radius of Pt nanodisks vs the pre-selected value. Nanodisks were fabricated using the MOSFET circuit in FIG. 11(B) and finite element simulations shown in FIG. 10. The inset shows a scanning electron micrograph of a Pt nanodisk electrode.

FIG. 15 shows a plot measured Pt disk radii vs values pre-selected by adjusting the resistance $R_G$ in the circuit of FIG. 11B. The data demonstrate that the size of the disk can be controlled using the circuit of FIG. 11B in conjunction with the calculations shown in FIG. 10A.

Figure 16:
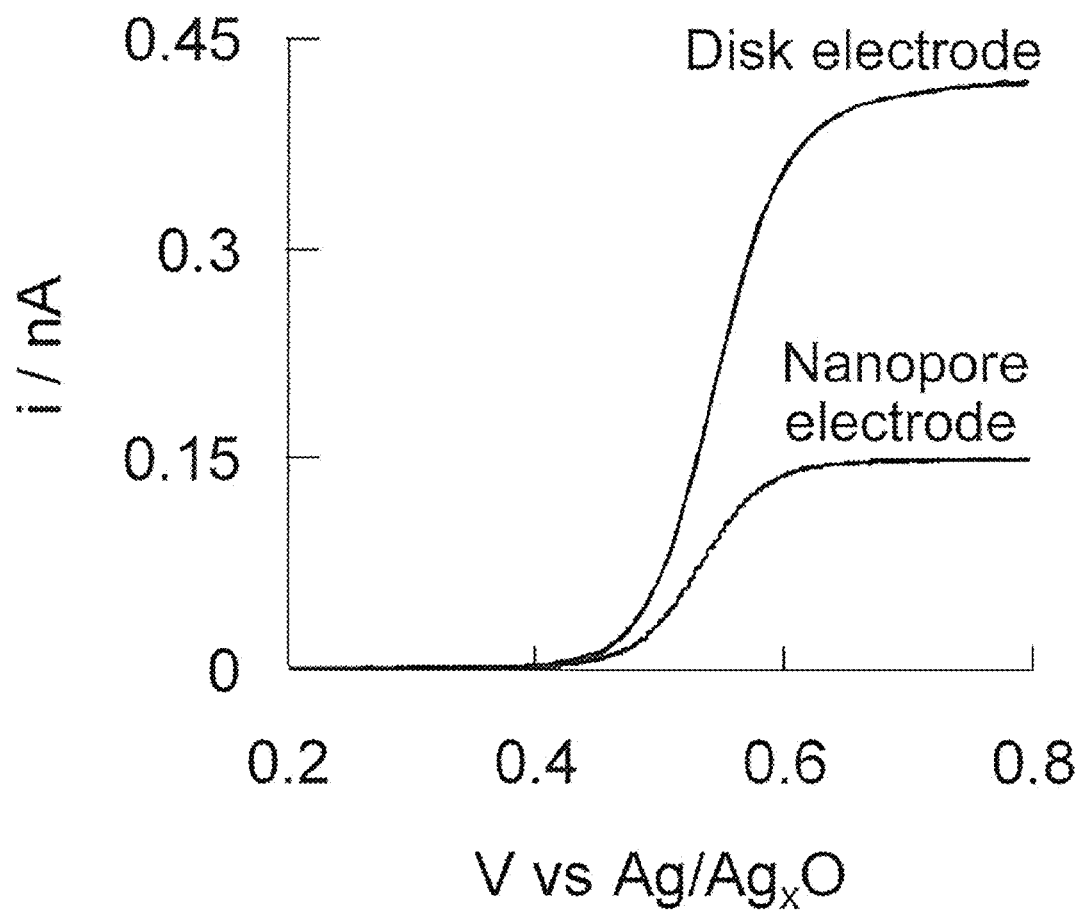
FIG. 16. Graph depicting voltammetric response of an 86-nm-radius Pt nanodisk electrode and the corresponding nanopore electrode in $CH_3CN$ containing 5.0 mM Fc and 0.2 M $TBAPF_6$.

Glass Nanopore Electrodes The glass nanopore electrode (see FIG. 1B) is fabricated by etching the Pt or Au nanodisk electrode in a 20% CaCl$_2$ solution, using a ~5 V amplitude AC voltage at a frequency of 60 Hz. The removal of Pt during etching creates a conical shaped pore, the depth of which is controlled by varying the etching time. The essential difference in the behavior of a Pt nanopore electrode with respect to a nanodisk electrode is a notable decrease in the diffusion-limited current. This reduction is a consequence of the larger mass-transfer resistance of the pore, and therefore scales with pore size. FIG. 16 shows the voltammetric responses of a 86-nm radius Pt disk electrode and the corresponding glass nanopore electrode in 5.0 mM Fc. This particular nanopore resulted from etching the Pt to a depth of ~250 nm, as determined from the dependence of the limiting current on the ratio between the pore depth and the radius of the orifice (d/a) (Bo Zhang, Yanhui Zhang, and Henry S. White, The Steady-State Voltammetric Response of the Nanopore Electrode, *Anal. Chem.* 78, 477-483 (2006)).

Figure 17:
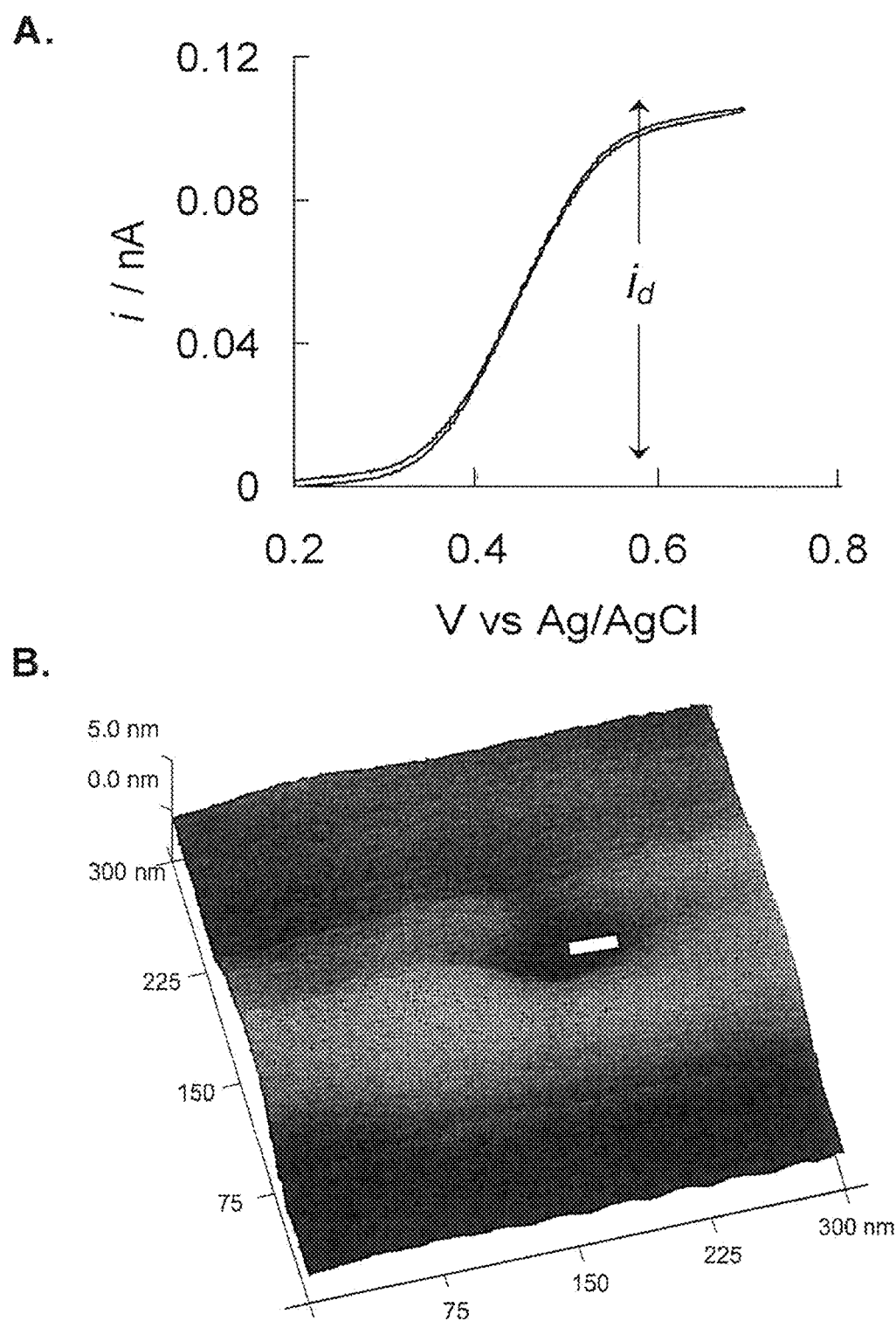
FIG. 17. (A) Voltammetric response of a 23-nm-radius Pt disk electrode in $CH_3CN$ containing 5.0 mM ferrocene and 0.2 M $TBAPF_6$. (B) AFM image of the orifice after the Pt is partially removed from the electrode in part (A). A 23-nm scale bar is shown across the nanopore.

The ~65% decrease in limiting current upon formation of the pore, FIG. 16, is consistent with published numerical simulations (*Anal. Chem.* 78, 477-483 (2006)). FIG. 17 shows (A) the voltammetric response of a Pt nanodisk electrode that is used to prepare a nanopore electrode, and (B) an AFM image of the orifice of a nanopore electrode that resulted from etching this nanodisk electrode, using the procedure outlined above. The Pt nanodisk radius is determined to be 23 nm from measurement of the diffusion limited current (FIG. 15A). A 23-nm scale bar is shown on the AFM image, illustrating the voltammetric measurement is in excellent agreement with the AFM image. This observation is consistent with SEM studies of larger pores, where the size of the nanopore and corresponding nanodisk electrode are similar. These results indicate that the voltammetric response yields accurate values of metal disk radii, and that electrochemical etching of the Pt in CaCl$_2$ does not remove a significant amount of glass from the walls of the resulting nanopore.

Glass Nanopore Membranes The sealed metal wire can be removed entirely from the glass by a combined etching and mechanical process to make a glass membrane containing an individual conical shape nanopore. Sealing very short lengths (25-50 μm) of the sharpened end of a Pt wire is accomplished using a specialized procedure. First, the tip is positioned at the middle of the glass capillary to avoid touching of the glass walls while the glass is being heated in the H$_2$ torch. Initially, the Pt is positioned >0.5 cm from the end of the glass capillary while the end of the capillary is heated. As the capillary softens and collapses, the interior surface becomes very flat. At this point, the glass capillary is removed from the flame and the Pt tip is positioned as close as possible toward the sealed end of the capillary, taking care to avoid physical touching of the glass surface by monitoring progress with an optical microscope. The capillary is them placed back into the lower, cooler part of the flame to continue softening the glass with constant visual inspection of the interior flat surface. As the glass continues to soften in the flame, it eventually contacts the sharp Pt tip. This contact is observed by eye (with considerable practice) in real time by the sudden appearance of a spot at the point of contact. The capillary, with Pt tip sealed at the end, is immediately removed from the flame and allowed to cool.

Figure 18:
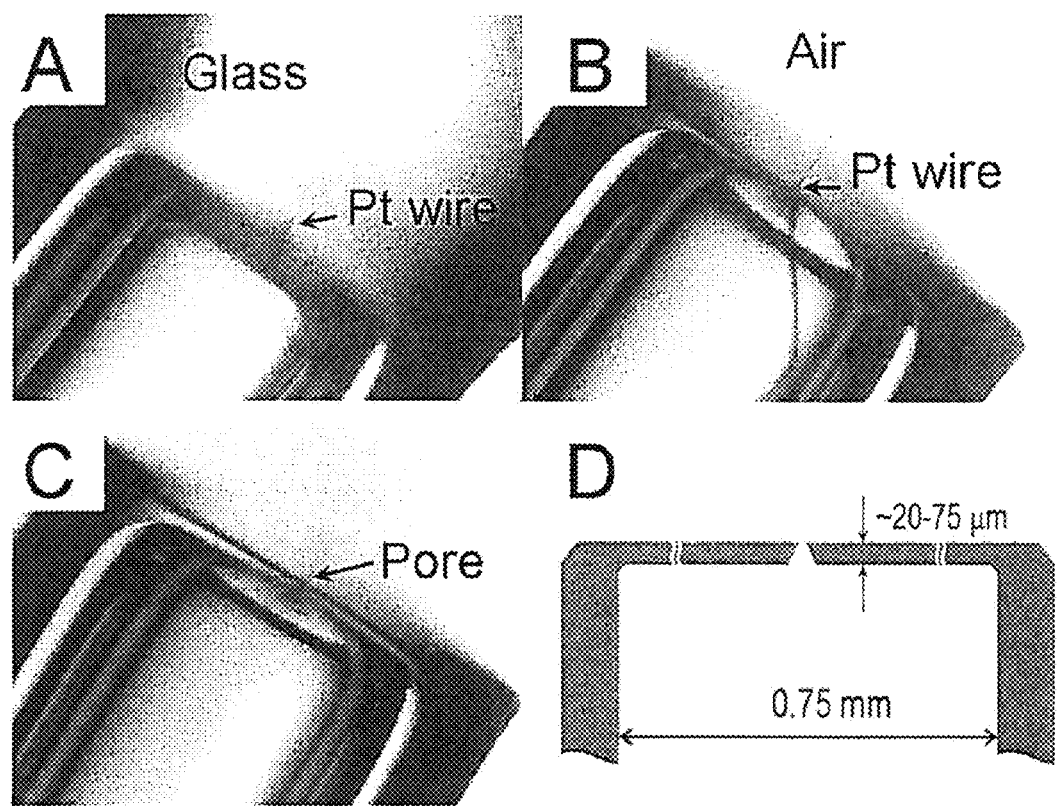
FIG. 18. Optical images during the preparation of a glass nanopore membrane. (A) Pt sealed in bulk glass; (B) Pt sealed in glass membrane after polishing glass; (C) glass nanopore membrane after removal of Pt; and (D) schematic of glass nanopore membrane.

The capillary is polished as described above using the electrical circuits, FIG. 10, to create a Pt nanodisk, the size of which can be characterized at this intermediate point. The Pt is then electrochemically etched in $CaCl_2$ to remove as much of the Pt wire as possible from the glass. The remaining Pt can readily be removed from the glass at this point by gently twisting the W wire attached to the Pt inside the capillary. FIG. 18 shows cross-sectional optical images of: (A) Pt tip sealed in glass; (B) the polished Pt nanodisk electrode; (C) the glass nanopore membrane after the tip is removed; and (D) a schematic drawing of the glass nanopore membrane showing the dimensions.

The radius of the small orifice of a glass nanopore membrane can be computed from the resistance of the pore measured in a solution of known ionic conductivity. The pore resistance is obtained from the slope of ohmic i-V curves recorded by varying the potential between two Ag/AgCl electrodes positioned on opposite sides: of the membrane. The relationship between the membrane resistance, $R_p$, and the small orifice radius, a, is given by: (Ryan J. White, Bo Zhang, Susan Daniel, John Tang, Eric N. Ervin, Paul S. Cremer, and Henry S. White, "Ionic Conductivity of the Aqueous Layer Separating a Lipid Bilayer Membrane and a Glass Support," *Langmuir,* 22, 10777-10783 (2006)).

$$R_p = \frac{1}{\kappa a}\left(\frac{1}{4} + \frac{1}{\pi \tan\theta}\right) \qquad (3)$$

where $R_p$ is the resistance, $\kappa$ is the conductivity of the solution, and $\theta$ is the half-cone angle. The latter is equal to the half-cone angle of the Pt wire before it is sealed, which is measured by optical microscopy.

Figure 19:
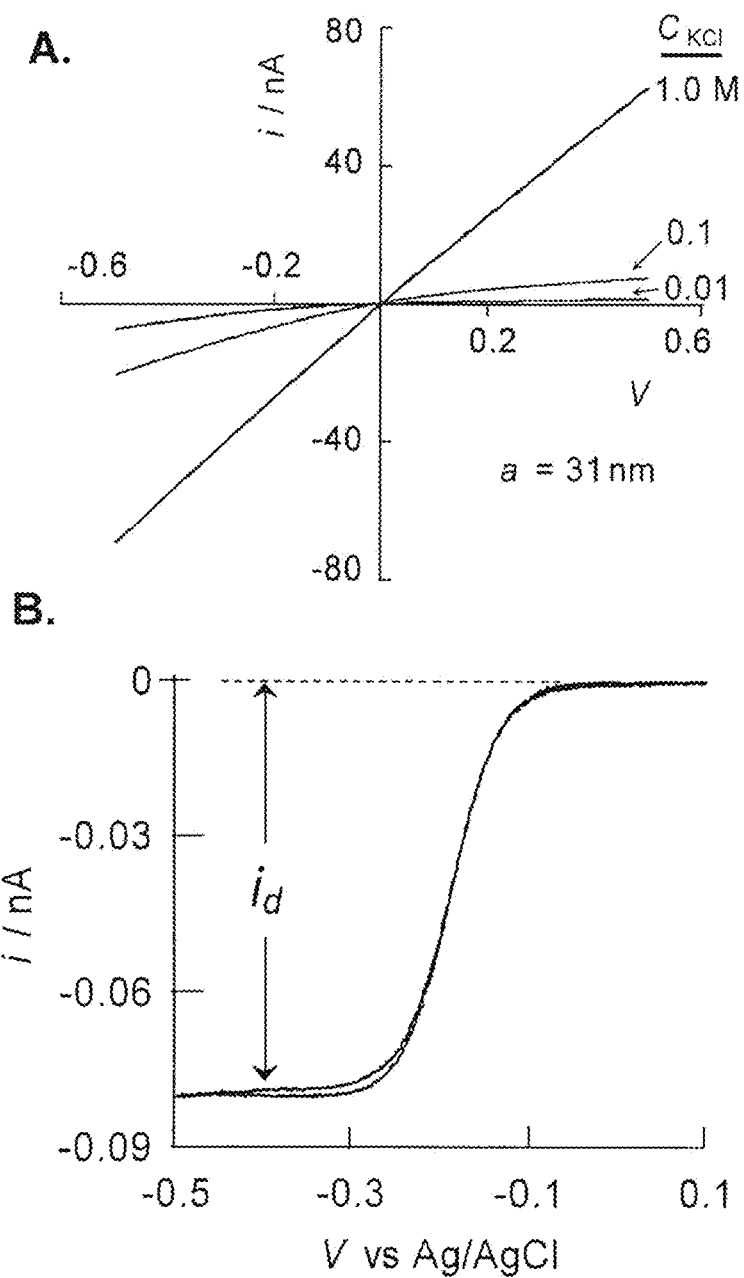
FIG. 19. (A) i-V curves for a 32-nm-radius glass nanopore membrane as a function of KCl concentration (the potential is measured across the membrane; scan rate 100 mV $s^{-1}$). (B) Voltammetric response of the corresponding Pt nanodisk in a 10.0 mM $Ru(NH_3)_6Cl_3$ solution containing 1 M KCl (scan rate 20 mV $s^{-1}$). The pore orifice size, as assessed from the slope of the i-V curve in (A) for 1 M KCl is 31 nm), which is equal, within error, to the value obtained from the Faradic response in (B) (a=32 nm).

FIG. 19B shows the voltammetric response of a Pt nanodisk electrode in a 10 mM $Ru(NH_3)_6Cl_3$ solution containing 0.2 M KCl. The radius of the Pt disk is calculated from the diffusion-limited steady-state current to be 32 nm. FIG. 19A shows the voltammetric response of the corresponding glass nanopore membrane in KCl solutions of varying concentration. The i-V response in 1 M KCl is found to be ohmic, with a slope corresponding to a small orifice radius of ~31 nm, in good agreement to the value calculated from the electrochemical response. The i-V response in KCl of low concentrations displays current rectification effects, similar to that reported by Wei et al. for current flow through tapered glass nanopipettes (Wei, C.; Bard, A. J.; Feldberg, S. W. *Anal. Chem.* 1997, 69, 4627.) Current rectification in conical nanopores has been recently reviewed by Siwy (Siwy, Z. S. *Adv. Funct. Mater.* 2006, 16, 735).

While this invention has been described in certain embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

All references, including publications, patents, and patent applications, cited herein are hereby incorporated by reference to the same extent as if each reference were individually and specifically indicated to be incorporated by reference and were set forth in its entirety herein. The references discussed herein are provided solely for their disclosure prior to the filing date of the present application. Nothing herein is to be construed as an admission that the inventors are not entitled to antedate such disclosure by virtue of prior invention.

What is claimed is:

1. A nanopore membrane, comprising:
   a membrane having a thickness, with a first, exterior, side and a second, interior, side, with the first side being opposite the second side, wherein the membrane is made from a material selected from the group consisting of glass, Si, $SiO_2$, $Si_3N_4$, quartz, alumina, nitrides, metals and polymers; and
   a nanopore extending through the membrane, thus forming a channel connecting from the first side to the second side of the membrane, wherein the nanopore has a first opening that opens to the first side of the membrane, a second opening that opens to the second side of the membrane and a depth, wherein the surface properties of at least one of: the first side of the membrane; the second side of the membrane; and the channel connecting the first side to the second side of the membrane are modified to change at least one of an electrical charge density, hydrophobicity and hydrophilicity property thereof, with the first side of the membrane being modified with a first entity, and the channel connecting the first side to the second side of the membrane being modified with a second entity which is different from the first entity.

2. The nanopore membrane of claim 1, wherein the nanopore is of a truncated conical shape and wherein a radius of the first opening of the nanopore is smaller than a radius of the second opening of the nanopore.

3. The nanopore membrane of claim 1, wherein the radius of the first opening of the nanopore ranges from about 2 nm to 500 nm.

4. The nanopore membrane of claim 1, wherein the radius of the first opening of the nanopore is larger than 500 nm.

5. The nanopore membrane of claim 1, wherein the first entity is a reactive silane with an inert terminus, and the second entity is a saline that comprises a first functional group able to react with the membrane and a second functional group able to react with a sensor element able to selectively bind a target analyte.

6. The nanopore membrane of claim 1, wherein the first entity is $Cl(Me)_2Si(CH_2)_3CN$, and the second entity is $EtO(Me)_2Si(CH_2)_3NH_2$.

7. A nanopore membrane comprising:
   a membrane having a thickness, with a first, exterior, side and a second, interior, side, with the first side being opposite the second side, wherein the membrane is made from a material selected from the group consisting of glass, Si, $SiO_2$, $Si_3N_4$, quartz, alumina, nitrides, metals and polymers; and
   a nanopore extending through the membrane, thus forming a channel connecting the first side to the second side of the membrane, wherein the nanopore has a first opening that opens to the first side of the membrane, a second opening that opens to the second side of the membrane and a depth;
   wherein the membrane is a bottom wall of a capillary which is sealed to produce the bottom wall.

8. The nanopore membrane of claim 7, wherein the surface properties of at least one of: the first side of the membrane; the second side of the membrane; and the channel connecting the first side to the second side of the membrane are modified to change at least one of an electrical charge density, hydrophobicity and hydrophilicity property thereof.

9. The nanopore membrane of claim 7, wherein the capillary is made from glass or quartz.

10. The nanopore membrane of claim 7, wherein the nanopore is of a truncated conical shape and wherein a radius of the first opening of the nanopore is smaller than a radius of the second opening of the nanopore.

11. The nanopore membrane of claim 7, wherein the radius of the first opening of the nanopore ranges from about 2 nm to 500 nm.

12. The nanopore membrane of claim 7, wherein the radius of the first opening of the nanopore is larger than 500 nm.

13. The nanopore membrane of claim 7, wherein the first side of the membrane is modified with a first entity, and the channel connecting the first side to the second side of the membrane is modified with a second entity.

14. The nanopore membrane of claim 13, wherein the first entity is a reactive silane with an inert terminus, and the second entity is a saline that comprises a first functional group able to react with the membrane and a second functional group able to react with a sensor element able to selectively bind a target analyte.

15. The nanopore membrane of claim 14, wherein the first entity is $Cl(Me)_2Si(CH_2)_3CN$, and the second entity is $EtO(Me)_2Si(CH_2)_3NH_2$.

16. The nanopore membrane of claim 13, wherein the first entity and the second entity are the same.

* * * * *